(12) United States Patent
Wang

(10) Patent No.: US 10,129,917 B2
(45) Date of Patent: Nov. 13, 2018

(54) DEVICE TO DEVICE COMMUNICATION METHOD AND USER EQUIPMENT

(71) Applicant: Huawei Device (Dongguan) Co., Ltd., Guangdong, Dongguan (CN)

(72) Inventor: Jian Wang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 132 days.

(21) Appl. No.: 15/112,849

(22) PCT Filed: Jan. 22, 2014

(86) PCT No.: PCT/CN2014/071129
§ 371 (c)(1),
(2) Date: Jul. 20, 2016

(87) PCT Pub. No.: WO2015/109461
PCT Pub. Date: Jul. 30, 2015

(65) Prior Publication Data
US 2016/0345375 A1    Nov. 24, 2016

(51) Int. Cl.
*H04W 76/02* (2009.01)
*H04W 76/14* (2018.01)
(Continued)

(52) U.S. Cl.
CPC .......... *H04W 76/14* (2018.02); *H04L 1/0041* (2013.01); *H04L 1/0056* (2013.01);
(Continued)

(58) Field of Classification Search
CPC ... H04W 76/023; H04W 8/005; H04W 48/16; H04W 76/046; H04W 4/005;
(Continued)

(56) References Cited

U.S. PATENT DOCUMENTS

2002/0165969 A1    11/2002    Gallant
2008/0165969 A1    7/2008    Khandekar et al.
(Continued)

FOREIGN PATENT DOCUMENTS

CN    102893685 A    1/2013
CN    103107867 A    5/2013
(Continued)

OTHER PUBLICATIONS

R1-135593 Nokia, NSN,"D2D Discovery Signal design",3GPP TSG-RAN WG1 Meeting #75 San Francisco, USA, Nov. 11-15, 2013,total 6 pages.
(Continued)

*Primary Examiner* — Jung Liu
(74) *Attorney, Agent, or Firm* — Huawei Device (Dongguan) Co., Ltd.

(57) ABSTRACT

The present invention discloses a D2D communication method and user equipment. The D2D communication method includes: determining, by first user equipment, a value of a scrambling code parameter, where the scrambling code parameter includes at least one of the following parameters: a common scrambling code parameter and a specific scrambling code parameter; scrambling, by the first user equipment, a to-be-sent bit according to the value of the scrambling code parameter; and sending, by the first user equipment, a scrambled to-be-sent bit. According to the D2D communication method and the user equipment disclosed in the present invention, transmission information can be scrambled and descrambled in a D2D communication process, thereby improving feasibility of a D2D communication scheme and improving user experience.

10 Claims, 5 Drawing Sheets

---

First user equipment determines a value of a scrambling code parameter, where the scrambling code parameter includes at least one of the following parameters: a common scrambling code parameter and a specific scrambling code parameter — 110

The first user equipment scrambles a to-be-sent bit according to the value of the scrambling code parameter — 120

The first user equipment sends a scrambled to-be-sent bit — 130

(51) Int. Cl.
*H04W 4/70* (2018.01)
*H04L 1/00* (2006.01)
*H04W 8/00* (2009.01)

(52) U.S. Cl.
CPC ............. *H04L 1/0061* (2013.01); *H04W 4/70* (2018.02); *H04W 8/005* (2013.01)

(58) Field of Classification Search
CPC ..... H04W 4/023; H04W 4/008; H04W 72/08; H04W 48/12; H04W 72/02; H04W 40/246; H04W 40/12; H04W 40/02; H04W 72/1278; H04W 4/08; H04L 1/0009; H04L 1/0025; H04L 1/0003
See application file for complete search history.

(56) References Cited

U.S. PATENT DOCUMENTS

| | | | | |
|---|---|---|---|---|
| 2013/0150061 A1* | 6/2013 | Shin | ...................... | H04W 4/005 455/450 |
| 2013/0272132 A1* | 10/2013 | Heo | ...................... | H04W 28/02 370/236.2 |
| 2014/0162668 A1* | 6/2014 | Na | ...................... | H04W 72/121 455/450 |
| 2014/0286284 A1* | 9/2014 | Lim | ...................... | H04L 5/003 370/329 |
| 2015/0023267 A1* | 1/2015 | Lim | ...................... | H04L 1/1854 370/329 |
| 2015/0085791 A1* | 3/2015 | Baghel | .................. | H04W 4/06 370/329 |
| 2015/0281938 A1* | 10/2015 | Wei | ...................... | H04W 8/005 370/254 |
| 2015/0319597 A1* | 11/2015 | Lee | ...................... | H04W 8/005 455/434 |
| 2016/0100355 A1* | 4/2016 | Chen | ..................... | H04W 8/005 370/232 |
| 2016/0112221 A1* | 4/2016 | Zhang | ............... | H04L 25/03866 370/328 |
| 2016/0174194 A1* | 6/2016 | Suzuki | .................. | H04B 1/713 370/312 |
| 2016/0183276 A1* | 6/2016 | Marinier | ............... | H04W 72/02 370/329 |
| 2016/0234045 A1* | 8/2016 | Lindoff | ............... | H04W 76/021 |
| 2016/0242022 A1* | 8/2016 | Jung | ..................... | H04W 48/16 |
| 2016/0316487 A1* | 10/2016 | Kalhan | ............. | H04W 72/1278 |
| 2016/0323868 A1* | 11/2016 | Kalhan | ............. | H04W 72/1278 |

FOREIGN PATENT DOCUMENTS

| | | |
|---|---|---|
| CN | 103517276 A | 1/2014 |
| EP | 1626514 B1 | 12/2008 |
| WO | 2013032227 A2 | 3/2013 |
| WO | 2013175414 A1 | 11/2013 |
| WO | 2015053698 A1 | 4/2015 |

OTHER PUBLICATIONS

R1-134353 Huawei, HiSilicon,"On the Need of a Feedback Loop for D2D Communication",3GPP TSG-RAN WG1 Meeting #74bis Guangzhou, China, Oct. 7-11, 2013,total 4 pages.
3GPP TS 36.211 V12.0.0,3rd Generation Partnership Project;Technical Specification Group Radio Access Network; Evolved Universal Terrestrial Radio Access (E-UTRA);Physical channels and modulation(Release 12),Dec. 2013,total 120 pages.
3GPP TS 36.213 V12.0.0,3rd Generation Partnership Project;Technical Specification Group Radio Access Network; Evolved Universal Terrestrial Radio Access (E-UTRA);Physical layer procedures(Release 12),Dec. 2013,total 186 pages.
3GPP TS 36.300 V12.0.0,3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 12),Dec. 2013,total 208 pages.
3GPP TSG RAN WG1 Meeting #75 R1-135385,"On the Need of a Feedback Loop for D2D Communication",Huawei, Hisilicon, Nov. 11-15, 2013,total 4 pages.

* cited by examiner

DEVICE TO DEVICE COMMUNICATION METHOD AND USER EQUIPMENT

CROSS-REFERENCE TO RELATED APPLICATIONS

This application is a National Stage entry under § 371 to application number PCT/CN2014/071129, filed Jan. 22, 2014, which is incorporated by reference herein in its entirety.

TECHNICAL FIELD

Embodiments of the present invention relate to the communications field, and more specifically, to a device to device communication method and user equipment.

BACKGROUND

A device to device proximity service (English full name: Device to Device Proximity Service, English abbreviation: D2D ProSe) between user equipment (English full name: User Equipment, English abbreviation: UE) has become a hot issue on a Long Term Evolution (English full name: Long Term Evolution, English abbreviation: LTE) system. Currently, a function of device to device (English full name: Device to Device, English abbreviation: D2D) communication has been applied to some existing cluster systems and some walkie-talkie devices. Because of a great success in commercialization of the LTE system, providing a D2D ProSe on the basis of a physical layer of the LTE system can not only enrich a service range of the LTE system, but also enable D2D communication to be used by more users.

Scrambling in the LTE system is mainly classified into two types: One type is data channel scrambling, which is used to scramble a data channel, and can implement interference randomization and user encryption; the other type is cyclic redundancy check (English full name: Cyclic Redundancy Check, English abbreviation: CRC) scrambling, which is used to scramble to-be-sent information after CRC, and can implicitly provide extra information and differentiate different users.

So far, there is no scrambling scheme for D2D communication. Therefore, in a process of performing D2D communication, how to scramble to-be-sent information at a transmit end and how to descramble received information at a receive end are problems to be resolved urgently.

SUMMARY

Embodiments of the present invention provide a D2D communication method and user equipment, so that transmission information can be scrambled and descrambled in a D2D communication process.

According to a first aspect, an embodiment of the present invention provides a D2D communication method, including: determining, by first user equipment, a value of a scrambling code parameter, where the scrambling code parameter includes at least one of the following parameters: a common scrambling code parameter and a specific scrambling code parameter; scrambling, by the first user equipment, a to-be-sent bit according to the value of the scrambling code parameter; and sending, by the first user equipment, a scrambled to-be-sent bit.

With reference to the first aspect, in a first possible implementation manner, the scrambling code parameter includes the common scrambling code parameter, and the determining, by first user equipment, a value of a scrambling code parameter includes: determining, by the first user equipment, a value of the common scrambling code parameter according to a D2D synchronization signal; determining, by the first user equipment, a value of the common scrambling code parameter according to a primary D2D synchronization channel PD2DSCH; or determining, by the first user equipment, a cluster identifier of a D2D cluster to which the first user equipment belongs as a value of the common scrambling code parameter.

With reference to the first possible implementation manner of the first aspect, in a second possible implementation manner, the determining, by the first user equipment, a value of the common scrambling code parameter according to a D2D synchronization signal includes: determining, by the first user equipment, a number of the D2D synchronization signal as the value of the common scrambling code parameter.

With reference to the first possible implementation manner of the first aspect, in a third possible implementation manner, the D2D synchronization signal includes a primary D2D synchronization signal PD2DSS and a secondary D2D synchronization signal SD2DSS, and the determining, by the first user equipment, a value of the common scrambling code parameter according to a D2D synchronization signal includes: determining, by the first user equipment, the value of the common scrambling code parameter according to the PD2DSS and the SD2DSS.

With reference to the third possible implementation manner of the first aspect, in a fourth possible implementation manner, the value $N_{D2D}^{comm}$ of the common scrambling code parameter is determined by using the following formula:

$$N_{D2D}^{comm} = 3 \times N_{SD2DSS} + N_{PD2DSS}, \text{ where}$$

$N_{SD2DSS}$ is a number of the SD2DSS, and $N_{PD2DSS}$ is a number of the PD2DSS.

With reference to the first aspect or with reference to the foregoing possible implementation manners of the first aspect, in a fifth possible implementation manner, the scrambling code parameter includes the specific scrambling code parameter, and the determining, by first user equipment, a value of a scrambling code parameter includes: determining, by the first user equipment, a value of the specific scrambling code parameter according to at least one of a D2D identifier of the first user equipment, a D2D group identifier of the first user equipment, or a service type identifier of the first user equipment.

With reference to the fifth possible implementation manner of the first aspect, in a sixth possible implementation manner, the determining, by the first user equipment, a value of the specific scrambling code parameter according to at least one of a D2D identifier of the first user equipment, a D2D group identifier of the first user equipment, or a service type identifier of the first user equipment includes: determining, by the first user equipment, the D2D identifier of the first user equipment as the value of the specific scrambling code parameter; determining, by the first user equipment, the D2D group identifier of the first user equipment as the value of the specific scrambling code parameter; or determining, by the first user equipment, the service type identifier of the first user equipment as the value of the specific scrambling code parameter.

With reference to the fifth possible implementation manner of the first aspect, in a seventh possible implementation manner, the determining, by the first user equipment, a value of the specific scrambling code parameter according to at least one of a D2D identifier of the first user equipment, a D2D group identifier of the first user equipment, or a service type identifier of the first user equipment includes: determining, by the first user equipment, the value of the specific scrambling code parameter according to the at least one of the D2D identifier of the first user equipment, the D2D group identifier of the first user equipment, or the service type identifier of the first user equipment, and a hash function; or determining, by the first user equipment, the value of the specific scrambling code parameter according to the at least one of the D2D identifier of the first user equipment, the D2D group identifier of the first user equipment, or the service type identifier of the first user equipment, and a truncate function.

With reference to the first aspect, in an eighth possible implementation manner, the determining, by first user equipment, a value of a scrambling code parameter includes: receiving, by the first user equipment, indication information sent by a base station or a cluster head of a D2D cluster to which the first user equipment belongs, where the indication information is used to indicate the value of the scrambling code parameter; and determining, by the first user equipment, the value of the scrambling code parameter according to the indication information.

With reference to the first aspect or with reference to the foregoing possible implementation manners of the first aspect, in a ninth possible implementation manner, the scrambling, by the first user equipment, a to-be-sent bit according to the value of the scrambling code parameter includes: determining, by the first user equipment, a scrambling code initial value according to the value of the scrambling code parameter; and generating, by the first user equipment, a scrambling code sequence according to the scrambling code initial value, and scrambling the to-be-sent bit by using the scrambling code sequence.

With reference to the ninth possible implementation manner of the first aspect, in a tenth possible implementation manner, the determining, by the first user equipment, a scrambling code initial value according to the value of the scrambling code parameter includes: determining, by the first user equipment, the value of the common scrambling code parameter as the scrambling code initial value; or determining, by the first user equipment, the value of the specific scrambling code parameter as the scrambling code initial value.

With reference to the ninth possible implementation manner of the first aspect, in an eleventh possible implementation manner, the determining, by the first user equipment, a scrambling code initial value according to the value of the scrambling code parameter includes: determining, by the first user equipment, the scrambling code initial value according to the value of the scrambling code parameter and a current timeslot number.

With reference to the eleventh possible implementation manner of the first aspect, in a twelfth possible implementation manner, the scrambling code initial value $c_{init}$ is determined by using the following formula:

$$c_{init} = \left(\left\lfloor \frac{n_s}{2} \right\rfloor + 1\right) \times (2 \times N_{D2D} + 1) \times 2^9 + N_{D2D}, \text{ or}$$

$$c_{init} = \left\lfloor \frac{n_s}{2} \right\rfloor \times 2^9 + N_{D2D},$$

where
$n_s$ is the current timeslot number, and $N_{D2D}$ is the value of the common scrambling code parameter or the value of the specific scrambling code parameter.

With reference to the eleventh possible implementation manner of the first aspect, in a thirteenth possible implementation manner, the scrambling code initial value $c_{init}$ is determined by using the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or}$$

$$c_{init} = N_{D2D}^{spec} \times 2^{14} + \left\lfloor \frac{n_s}{2} \right\rfloor \times 2^9 + N_{D2D}^{comm},$$

where
$n_s$ is the current timeslot number, $N_{D2D}^{comm}$ is the value of the common scrambling code parameter, and $N_{D2D}^{spec}$ is the value of the specific scrambling code parameter.

With reference to the first aspect or with reference to any one possible implementation manner of the foregoing first to eighth possible implementation manners of the first aspect, in a fourteenth possible implementation manner, the scrambling, by the first user equipment, a to-be-sent bit according to the value of the scrambling code parameter includes: dividing, by the first user equipment, the value of the scrambling code parameter into at least two scrambling code segments; and scrambling, by the first user equipment, the to-be-sent bit by using the at least two scrambling code segments.

With reference to the fourteenth possible implementation manner of the first aspect, in a fifteenth possible implementation manner, the scrambling, by the first user equipment, the to-be-sent bit by using the at least two scrambling code segments includes: generating, by the first user equipment, a cyclic redundancy code check CRC bit of the to-be-sent bit, and using the to-be-sent bit and the CRC bit of the to-be-sent bit as a to-be-scrambled bit; dividing, by the first user equipment, the to-be-scrambled bit into at least two to-be-scrambled bit segments; generating, by the first user equipment, a CRC bit of each to-be-scrambled bit segment in the at least two to-be-scrambled bit segments; and scrambling, by the first user equipment, CRC bits of the at least two to-be-scrambled bit segments by using the at least two scrambling code segments.

With reference to the fourteenth possible implementation manner of the first aspect, in a sixteenth possible implementation manner, the scrambling, by the first user equipment, the to-be-sent bit by using the at least two scrambling code segments includes: dividing, by the first user equipment, the to-be-sent bit into at least two to-be-sent bit segments; generating, by the first user equipment, a CRC bit of each to-be-sent bit segment in the at least two to-be-sent bit segments; and scrambling, by the first user equipment, CRC bits of the at least two to-be-sent bit segments by using the at least two scrambling code segments.

According to a second aspect, an embodiment of the present invention provides another D2D communication method, including: receiving, by second user equipment, a bit sent by first user equipment; determining, by the second user equipment, a value of a scrambling code parameter of the first user equipment, where the scrambling code parameter includes at least one of the following parameters: a common scrambling code parameter and a specific scrambling code parameter; and descrambling, by the second user equipment, the received bit according to the value of the scrambling code parameter.

With reference to the second aspect, in a first possible implementation manner, a value of the common scrambling code parameter is determined by the first user equipment according to a D2D synchronization signal; a value of the common scrambling code parameter is determined by the first user equipment according to a primary D2D synchronization channel PD2DSCH; or a value of the common scrambling code parameter is a cluster identifier of a D2D cluster to which the first user equipment belongs.

With reference to the second aspect or with reference to the first possible implementation manner of the second aspect, in a second possible implementation manner, a value of the specific scrambling code parameter is obtained after an operation is performed on at least one of a D2D identifier of the first user equipment, a D2D group identifier of the first user equipment, or a service type identifier of the first user equipment by using a preset function.

With reference to the second possible implementation manner of the second aspect, in a third possible implementation manner, the value of the specific scrambling code parameter is the D2D identifier of the first user equipment; the value of the specific scrambling code parameter is the D2D group identifier of the first user equipment; or the value of the specific scrambling code parameter is the service type identifier of the first user equipment.

With reference to the second possible implementation manner of the second aspect, in a fourth possible implementation manner, the preset function is a hash function or a truncate function.

With reference to the second aspect or with reference to the foregoing possible implementation manners of the second aspect, in a fifth possible implementation manner, the determining, by the second user equipment, a value of a scrambling code parameter of the first user equipment includes: determining, by the second user equipment, the value of the common scrambling code parameter according to the D2D synchronization signal; determining, by the second user equipment, the value of the common scrambling code parameter according to the primary D2D synchronization channel PD2DSCH; or determining, by the second user equipment, a cluster identifier of a D2D cluster to which the second user equipment belongs as the value of the common scrambling code parameter.

With reference to the fifth possible implementation manner of the second aspect, in a sixth possible implementation manner, the determining, by the second user equipment, the value of the common scrambling code parameter according to the D2D synchronization signal includes: determining, by the second user equipment, a number of the D2D synchronization signal as the value of the common scrambling code parameter.

With reference to the fifth possible implementation manner of the second aspect, in a seventh possible implementation manner, the D2D synchronization signal includes a primary D2D synchronization signal PD2DSS and a secondary D2D synchronization signal SD2DSS, and the determining, by the second user equipment, the value of the common scrambling code parameter according to the D2D synchronization signal includes: determining, by the second user equipment, the value of the common scrambling code parameter according to the PD2DSS and the SD2DSS.

With reference to the seventh possible implementation manner of the second aspect, in an eighth possible implementation manner, the value $N_{D2D}^{comm}$ of the common scrambling code parameter is determined by using the following formula:

$$N_{D2D}^{comm} = 3 \times N_{SD2DSS} + N_{PD2DSS}, \text{ where}$$

$N_{SD2DSS}$ is a number of the SD2DSS, and $N_{PD2DSS}$ is a number of the PD2DSS.

With reference to the second aspect or with reference to any one possible implementation manner of the foregoing first to fourth possible implementation manners of the second aspect, in a ninth possible implementation manner, the determining, by the second user equipment, a value of a scrambling code parameter of the first user equipment includes: receiving, by the second user equipment, indication information sent by a base station or a cluster head of a D2D cluster to which the second user equipment belongs, where the indication information is used to indicate the value of the scrambling code parameter of the first user equipment; and determining, by the second user equipment, the value of the scrambling code parameter according to the indication information.

With reference to the second aspect or the foregoing possible implementation manners of the second aspect, in a tenth possible implementation manner, the descrambling, by the second user equipment, the received bit according to the value of the scrambling code parameter includes: determining, by the second user equipment, a scrambling code initial value according to the value of the scrambling code parameter; and generating, by the second user equipment, a scrambling code sequence according to the scrambling code initial value, and descrambling the received bit by using the scrambling code sequence.

With reference to the tenth possible implementation manner of the second aspect, in an eleventh possible implementation manner, the determining, by the second user equipment, a scrambling code initial value according to the value of the scrambling code parameter includes: determining, by the second user equipment, the value of the common scrambling code parameter as the scrambling code initial value; or determining, by the second user equipment, the value of the specific scrambling code parameter as the scrambling code initial value.

With reference to the tenth possible implementation manner of the second aspect, in a twelfth possible implementation manner, the determining, by the second user equipment, a scrambling code initial value according to the value of the scrambling code parameter includes: determining, by the second user equipment, the scrambling code initial value according to the value of the scrambling code parameter and a current timeslot number.

With reference to the twelfth possible implementation manner of the second aspect, in a thirteenth possible implementation manner, the scrambling code initial value $c_{init}$ is determined by using the following formula:

$$c_{init} = \left(\left\lfloor \frac{n_s}{2} \right\rfloor + 1\right) \times (2 \times N_{D2D} + 1) \times 2^9 + N_{D2D}, \text{ or}$$

$$c_{init} = \left\lfloor \frac{n_s}{2} \right\rfloor \times 2^9 + N_{D2D},$$

where $n_s$ is the current timeslot number, and $N_{D2D}$ is the value of the common scrambling code parameter or the value of the specific scrambling code parameter.

With reference to the twelfth possible implementation manner of the second aspect, in a fourteenth possible implementation manner, the scrambling code initial value $c_{init}$ is determined by using the following formula:

$$c_{init} = \left(\left\lfloor\frac{n_s}{2}\right\rfloor + 1\right) \times (2 \times N_{D2D}^{comm} + 1) \times 2^{16} + N_{D2D}^{spec}, \text{ or}$$

$$c_{init} = N_{D2D}^{spec} \times 2^{14} + \left\lfloor\frac{n_s}{2}\right\rfloor \times 2^9 + N_{D2D}^{comm},$$

where $n_s$ is the current timeslot number, $N_{D2D}^{comm}$ is the value of the common scrambling code parameter, and $N_{D2D}^{spec}$ is the value of the specific scrambling code parameter.

With reference to the second aspect or any one of the foregoing possible implementation manners of the second aspect, in a fifteenth possible implementation manner, the bit received by the second user equipment includes at least two bit segments, and each bit segment in the at least two bit segments includes a data bit segment and a CRC bit; and the descrambling, by the second user equipment, the received bit by using the scrambling code sequence includes: dividing, by the second user equipment, the value of the scrambling code parameter into at least two scrambling code segments; and descrambling, by the second user equipment, CRC bits of the at least two bit segments by using the at least two scrambling code segments, to obtain at least two to-be-checked bit segments.

With reference to the fifteenth possible implementation manner of the second aspect, in a sixteenth possible implementation manner, the method further includes: performing, by the second user equipment, CRC check on each to-be-checked bit segment in the at least two to-be-checked bit segments to obtain a data bit segment of each to-be-checked bit segment; and cascading, by the second user equipment, data bit segments of the at least two to-be-checked bit segments to obtain a data bit.

With reference to the sixteenth possible implementation manner of the second aspect, in a seventeenth possible implementation manner, the data bit includes an original data bit and a CRC bit, and the method further includes: performing, by the second user equipment, CRC check on the data bit to obtain the original data bit.

According to a third aspect, user equipment is provided, including: a determining module, configured to determine a value of a scrambling code parameter, where the scrambling code parameter includes at least one of the following parameters: a common scrambling code parameter and a specific scrambling code parameter; a scrambling module, configured to scramble a to-be-sent bit according to the value that is of the scrambling code parameter and that is determined by the determining module; and a sending module, configured to send a to-be-sent bit scrambled by the scrambling module.

With reference to the third aspect, in a first possible implementation manner, the scrambling code parameter includes the common scrambling code parameter, and the determining module includes a first determining unit, where the first determining unit is configured to determine a value of the common scrambling code parameter according to a D2D synchronization signal; the first determining unit is configured to determine a value of the common scrambling code parameter according to a primary D2D synchronization channel PD2DSCH; or the first determining unit is configured to determine a cluster identifier of a D2D cluster to which the user equipment belongs as a value of the common scrambling code parameter.

With reference to the first possible implementation manner of the third aspect, in a second possible implementation manner, the first determining unit is specifically configured to determine a number of the D2D synchronization signal as the value of the common scrambling code parameter.

With reference to the first possible implementation manner of the third aspect, in a third possible implementation manner, the D2D synchronization signal includes a primary D2D synchronization signal PD2DSS and a secondary D2D synchronization signal SD2DSS; and the first determining unit is specifically configured to determine the value of the common scrambling code parameter according to the PD2DSS and the SD2DSS.

With reference to the third possible implementation manner of the third aspect, in a fourth possible implementation manner, the value $N_{D2D}^{comm}$ of the common scrambling code parameter is determined by using the following formula:

$N_{D2D}^{comm} = 3 \times N_{SD2DSS} + N_{PD2DSS}$, where $N_{SD2DSS}$ is a number of the SD2DSS, and $N_{PD2DSS}$ is a number of the PD2DSS.

With reference to the third aspect or with reference to the foregoing possible implementation manners of the third aspect, in a fifth possible implementation manner, the scrambling code parameter includes the specific scrambling code parameter, and the determining module includes a second determining unit, configured to determine a value of the specific scrambling code parameter according to at least one of a D2D identifier of the user equipment, a D2D group identifier of the user equipment, or a service type identifier of the user equipment.

With reference to the fifth possible implementation manner of the third aspect, in a sixth possible implementation manner, the second determining unit is specifically configured to: determine the D2D identifier of the user equipment as the value of the specific scrambling code parameter; determine the D2D group identifier of the user equipment as the value of the specific scrambling code parameter; or determine the service type identifier of the user equipment as the value of the specific scrambling code parameter.

With reference to the fifth possible implementation manner of the third aspect, in a seventh possible implementation manner, the second determining unit is specifically configured to: determine the value of the specific scrambling code parameter according to the at least one of the D2D identifier of the user equipment, the D2D group identifier of the user equipment, or the service type identifier of the user equipment, and a hash function; or determine the value of the specific scrambling code parameter according to the at least one of the D2D identifier of the user equipment, the D2D group identifier of the user equipment, or the service type identifier of the user equipment, and a truncate function.

With reference to the third aspect, in an eighth possible implementation manner, the determining module includes: a receiving unit, configured to receive indication information sent by a base station or a cluster head of a D2D cluster to which the user equipment belongs, where the indication information is used to indicate the value of the scrambling code parameter; and a third determining unit, configured to determine the value of the scrambling code parameter according to the indication information received by the receiving unit.

With reference to the third aspect or with reference to the foregoing possible implementation manners of the third aspect, in a ninth possible implementation manner, the scrambling module includes: a determining unit, configured to determine a scrambling code initial value according to the value of the scrambling code parameter; and a first scrambling unit, configured to generate a scrambling code sequence according to the scrambling code initial value determined by the determining unit, and scramble the to-be-sent bit by using the scrambling code sequence.

With reference to the ninth possible implementation manner of the third aspect, in a tenth possible implementation manner, the determining unit is specifically configured to: determine the value of the common scrambling code parameter as the scrambling code initial value, or determine the value of the specific scrambling code parameter as the scrambling code initial value.

With reference to the ninth possible implementation manner of the third aspect, in an eleventh possible implementation manner, the determining unit is specifically configured to determine the scrambling code initial value according to the value of the scrambling code parameter and a current timeslot number.

With reference to the eleventh possible implementation manner of the third aspect, in a twelfth possible implementation manner, the determining unit is specifically configured to determine the scrambling code initial value $c_{init}$ according to the following formula:

$$c_{init} = \left(\left\lfloor \frac{n_s}{2} \right\rfloor + 1\right) \times (2 \times N_{D2D} + 1) \times 2^9 + N_{D2D}, \text{ or}$$

$$c_{init} = \left\lfloor \frac{n_s}{2} \right\rfloor \times 2^9 + N_{D2D},$$

where
  $n_s$ is the current timeslot number, and $N_{D2D}$ is the value of the common scrambling code parameter or the value of the specific scrambling code parameter.

With reference to the eleventh possible implementation manner of the third aspect, in a thirteenth possible implementation manner, the determining unit is specifically configured to determine the scrambling code initial value $c_{init}$ according to the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or}$$

$$c_{init} = N_{D2D}^{spec} \times 2^{14} + \left\lfloor \frac{n_s}{2} \right\rfloor \times 2^9 + N_{D2D}^{comm},$$

where
  $n_s$ is the current timeslot number, $N_{D2D}^{comm}$ is the value of the common scrambling code parameter, and $N_{D2D}^{spec}$ is the value of the specific scrambling code parameter.

With reference to the third aspect or with reference to any one possible implementation manner of the foregoing first to eighth possible implementation manners of the third aspect, in a fourteenth possible implementation manner, the scrambling module includes: a segmentation unit, configured to divide the value of the scrambling code parameter into at least two scrambling code segments; and a second scrambling unit, configured to scramble the to-be-sent bit by using the at least two scrambling code segments divided by the segmentation unit.

With reference to the fourteenth possible implementation manner of the third aspect, in a fifteenth possible implementation manner, the second scrambling unit includes: a first generation subunit, configured to: generate a cyclic redundancy code check (CRC) bit of the to-be-sent bit, and use the to-be-sent bit and the CRC bit of the to-be-sent bit as a to-be-scrambled bit; a first segmentation subunit, configured to divide the to-be-scrambled bit generated by the first generation subunit into at least two to-be-scrambled bit segments, where the first generation subunit is further configured to generate a CRC bit of each to-be-scrambled bit segment in the at least two to-be-scrambled bit segments divided by the first segmentation subunit; and a first scrambling subunit, configured to separately scramble, by using the at least two scrambling code segments, CRC bits that are of the at least two to-be-scrambled bit segments and that are generated by the first generation subunit.

With reference to the fourteenth possible implementation manner of the third aspect, in a sixteenth possible implementation manner, the second scrambling unit includes: a second segmentation subunit, configured to divide the to-be-sent bit into at least two to-be-sent bit segments; a second generation subunit, configured to generate a CRC bit of each to-be-sent bit segment in the at least two to-be-sent bit segments divided by the second segmentation subunit; and a second scrambling subunit, configured to scramble, by using the at least two scrambling code segments, CRC bits that are of the at least two to-be-sent bit segments and that are generated by the second generation subunit.

According to a fourth aspect, another user equipment is provided, including: a receiving module, configured to receive a bit sent by first user equipment; a determining module, configured to determine a value of a scrambling code parameter of the first user equipment, where the scrambling code parameter includes at least one of the following parameters: a common scrambling code parameter and a specific scrambling code parameter; and a descrambling module, configured to descramble, according to the value that is of the scrambling code parameter and that is determined by the determining module, the bit received by the receiving module.

With reference to the fourth aspect, in a first possible implementation manner, a value of the common scrambling code parameter is determined by the first user equipment according to a D2D synchronization signal; a value of the common scrambling code parameter is determined by the first user equipment according to a primary D2D synchronization channel PD2DSCH; or a value of the common scrambling code parameter is a cluster identifier of a D2D cluster to which the first user equipment belongs.

With reference to the fourth aspect or with reference to the first possible implementation manner of the fourth aspect, in a second possible implementation manner, a value of the specific scrambling code parameter is obtained after an operation is performed on at least one of a D2D identifier of the first user equipment, a D2D group identifier of the first user equipment, or a service type identifier of the first user equipment by using a preset function.

With reference to the second possible implementation manner of the fourth aspect, in a third possible implementation manner, the value of the specific scrambling code parameter is the D2D identifier of the first user equipment; the value of the specific scrambling code parameter is the D2D group identifier of the first user equipment; or the value of the specific scrambling code parameter is the service type identifier of the first user equipment.

With reference to the second possible implementation manner of the fourth aspect, in a fourth possible implementation manner, the preset function is a hash function or a truncate function.

With reference to the fourth aspect or with reference to the foregoing possible implementation manners of the fourth aspect, in a fifth possible implementation manner, the determining module includes a first determining unit, where the first determining unit is configured to determine the value of the common scrambling code parameter according to the D2D synchronization signal; the first determining unit is configured to determine the value of the common scrambling code parameter according to the primary D2D synchronization channel PD2DSCH; or the first determining unit is configured to determine a cluster identifier of a D2D cluster to which the user equipment belongs as the value of the common scrambling code parameter.

With reference to the fifth possible implementation manner of the fourth aspect, in a sixth possible implementation manner, the first determining unit is specifically configured to determine a number of the D2D synchronization signal as the value of the common scrambling code parameter.

With reference to the fifth possible implementation manner of the fourth aspect, in a seventh possible implementation manner, the D2D synchronization signal includes a primary D2D synchronization signal PD2DSS and a secondary D2D synchronization signal SD2DSS; and the first determining unit is specifically configured to determine the value of the common scrambling code parameter according to the PD2DSS and the SD2DSS.

With reference to the seventh possible implementation manner of the fourth aspect, in an eighth possible implementation manner, the value $N_{D2D}^{comm}$ of the common scrambling code parameter is determined by using the following formula:

$$N_{D2D}^{comm} = 3 \times N_{SD2DSS} + N_{PD2DSS}, \text{ where}$$

$N_{SD2DSS}$ is a number of the SD2DSS, and $N_{PD2DSS}$ is a number of the PD2DSS.

With reference to the fourth aspect or with reference to any one possible implementation manner of the foregoing first to fourth possible implementation manners of the fourth aspect, in a ninth possible implementation manner, the determining module includes: a receiving unit, configured to receive indication information sent by a base station or a cluster head of a D2D cluster to which the user equipment belongs, where the indication information is used to indicate the value of the scrambling code parameter of the first user equipment; and a second determining unit, configured to determine the value of the scrambling code parameter according to the indication information received by the receiving unit.

With reference to the fourth aspect or with reference to the foregoing possible implementation manners of the fourth aspect, in a tenth possible implementation manner, the descrambling module includes: a third determining unit, configured to determine a scrambling code initial value according to the value of the scrambling code parameter; and a first descrambling unit, configured to generate a scrambling code sequence according to the scrambling code initial value determined by the third determining unit, and descramble the received bit by using the scrambling code sequence.

With reference to the tenth possible implementation manner of the fourth aspect, in an eleventh possible implementation manner, the third determining unit is specifically configured to: determine the value of the common scrambling code parameter as the scrambling code initial value, or determine the value of the specific scrambling code parameter as the scrambling code initial value.

With reference to the tenth possible implementation manner of the fourth aspect, in a twelfth possible implementation manner, the third determining unit is specifically configured to determine the scrambling code initial value according to the value of the scrambling code parameter and a current timeslot number.

With reference to the twelfth possible implementation manner of the fourth aspect, in a thirteenth possible implementation manner, the third determining unit is specifically configured to determine the scrambling code initial value $c_{init}$ according to the following formula:

$$c_{init} = \left(\left\lfloor \frac{n_s}{2} \right\rfloor + 1\right) \times (2 \times N_{D2D} + 1) \times 2^9 + N_{D2D}, \text{ or}$$

$$c_{init} = \left\lfloor \frac{n_s}{2} \right\rfloor \times 2^9 + N_{D2D},$$

where $n_s$ is the current timeslot number, and $N_{D2D}$ is the value of the common scrambling code parameter or the value of the specific scrambling code parameter.

With reference to the twelfth possible implementation manner of the fourth aspect, in a fourteenth possible implementation manner, the third determining unit is specifically configured to determine the scrambling code initial value $c_{init}$ according to the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or}$$

$$c_{init} = N_{D2D}^{spec} \times 2^{14} + \left\lfloor \frac{n_s}{2} \right\rfloor \times 2^9 + N_{D2D}^{comm},$$

where $n_s$ is the current timeslot number, $N_{D2D}^{comm}$ is the value of the common scrambling code parameter, and $N_{D2D}^{spec}$ is the value of the specific scrambling code parameter.

With reference to the fourth aspect or with reference to any one of the foregoing possible implementation manners of the fourth aspect, in a fifteenth possible implementation manner, the bit received by the receiving module includes at least two bit segments, and each bit segment in the at least two bit segments includes a data bit segment and a CRC bit; and the descrambling module includes: a segmentation unit, configured to divide the value of the scrambling code parameter into at least two scrambling code segments; and a second descrambling unit, configured to separately descramble CRC bits of the at least two bit segments by using the at least two scrambling code segments divided by the segmentation unit, to obtain at least two to-be-checked bit segments.

With reference to the fifteenth possible implementation manner of the fourth aspect, in a sixteenth possible implementation manner, the user equipment further includes: a CRC check module, configured to perform CRC check on each to-be-checked bit segment in the at least two to-be-checked bit segments obtained by the second descrambling unit, to obtain a data bit segment of each to-be-checked bit segment; and a cascading module, configured to cascade data bit segments of the at least two to-be-checked bit segments obtained by the CRC check module, to obtain a data bit.

With reference to the sixteenth possible implementation manner of the fourth aspect, in a seventeenth possible implementation manner, the data bit obtained by the cascading module includes an original data bit and a CRC bit; and the CRC check module is further configured to perform CRC check on the data bit obtained by the cascading module, to obtain the original data bit.

Based on the foregoing technical solutions, according to the D2D communication method and the user equipment provided in the embodiments of the present invention, a transmit end determines a value of at least one scrambling code parameter of a common scrambling code parameter or a specific scrambling code parameter, and scrambles a to-be-sent bit according to the value of the scrambling code parameter, so that transmission information can be scrambled in a D2D communication process; a receive end determines a value of at least one scrambling code parameter of a common scrambling code parameter or a specific scrambling code parameter, and descrambles a received bit according to the value of the scrambling code parameter, so that transmission information can be descrambled in a D2D communication process, thereby further improving feasibility of a D2D communication scheme and improving user experience.

BRIEF DESCRIPTION OF DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, for example, a Global System for Mobile Communications (English full name: Global System of Mobile communication, English abbreviation: GSM), a Code Division Multiple Access (English full name: Code Division Multiple Access, English abbreviation: CDMA) system, a Wideband Code Division Multiple Access (English full name: Wideband Code Division Multiple Access, English abbreviation: WCDMA) system, a general packet radio service (English full name: General Packet Radio Service, English abbreviation: GPRS), an LTE system, a Long Term Evolution Advanced (English full name: Advanced Long Term Evolution, English abbreviation: LTE-A) system, and a Universal Mobile Telecommunications System (English full name: Universal Mobile Telecommunication System, English abbreviation: UMTS).

It should be understood that, in the embodiments of the present invention, user equipment (English full name: User Equipment, English abbreviation: UE) includes but is not limited to a mobile station (English full name: Mobile Station, English abbreviation: MS), a mobile terminal (English full name: Mobile Terminal), a mobile telephone (English full name: Mobile Telephone), a handset (English full name: handset), a portable equipment (English full name: portable equipment), and the like.

The user equipment may communicate with one or more core networks by using a radio access network (English full name: Radio Access Network, English abbreviation: RAN). For example, the user equipment may be a mobile telephone (or referred to as a "cellular" phone), or a computer with a wireless communication function; or the user equipment may be a portable, pocket-sized, handheld, computer built-in, or in-vehicle mobile apparatus.

In the embodiments of the present invention, a base station may be a base transceiver station (English full name: Base Transceiver Station, English abbreviation: BTS) in GSM or CDMA, or may be a nodeB (NodeB) in WCDMA, or may be an evolved NodeB (English full name: evolved Node B, English abbreviation: eNB or e-NodeB) in LTE, which is not limited in the embodiments of the present invention.

Figure 1:
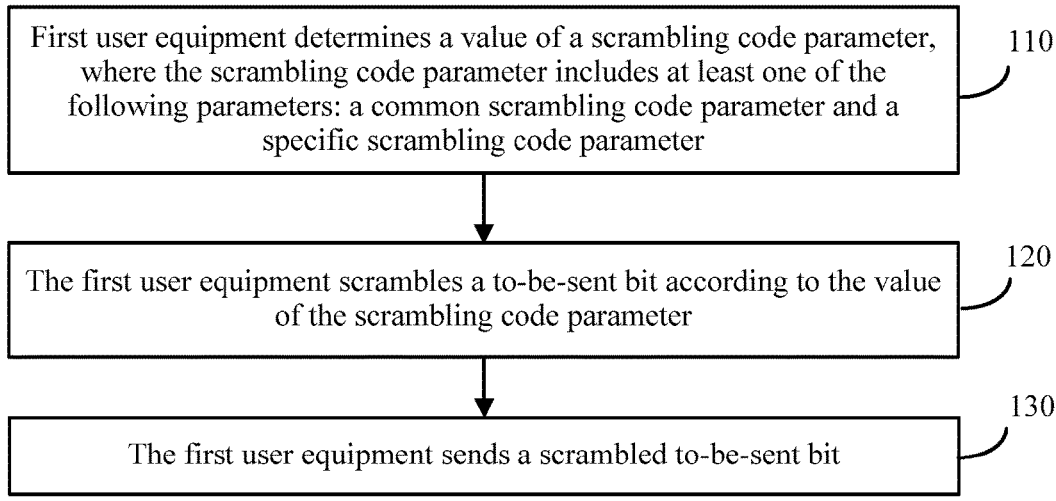
FIG. 1 is a schematic flowchart of a D2D communication method according to an embodiment of the present invention.

FIG. 1 shows a schematic flowchart of a D2D communication method 100 according to an embodiment of the present invention. As shown in FIG. 1, the method 100 includes:

S110. First user equipment determines a value of a scrambling code parameter, where the scrambling code parameter includes at least one of the following parameters: a common scrambling code parameter and a specific scrambling code parameter.

S120. The first user equipment scrambles a to-be-sent bit according to the value of the scrambling code parameter.

S130. The first user equipment sends a scrambled to-be-sent bit.

Therefore, according to the D2D communication method in this embodiment of the present invention, a transmit end determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

In this embodiment of the present invention, the scrambling code parameter includes the common scrambling code parameter and/or the specific scrambling code parameter (English full name: specific scrambling parameter), and correspondingly, the value of the scrambling code parameter may include a value of the common scrambling code parameter and/or a value of the specific scrambling code parameter.

The common scrambling code parameter may be a scrambling code parameter shared by multiple UEs, and can reflect a common characteristic of the multiple user equipments, for example, a scrambling code parameter shared by all UEs in a D2D cluster. The specific scrambling code parameter may be a UE-specific scrambling code parameter, and can reflect a dedicated characteristic of user equipment, for example, the specific scrambling code parameter is an identifier of UE, so that a receive end can differentiate the user equipment from another user equipment according to the specific scrambling code parameter. However, this embodiment of the present invention is not limited thereto.

For example, the first user equipment sends a discovery signal. In some scenarios such as an advertising scenario, the first user equipment needs to be discovered by as many other user equipments as possible; therefore, the first user equipment may scramble the discovery signal by using the common scrambling code parameter, and user equipment that receives the discovery signal may descramble the discovery signal by using the common scrambling code parameter. In some other scenarios, for example, if the first user equipment wants to be discovered only by user equipment with which the first user equipment is familiar (for example, user equipment that belongs to a friend group of the first user equipment), may scramble the discovery signal by using a specific scrambling code parameter of the friend group and send the discovery signal, user equipment that receives the discovery signal can descramble the discovery signal only by using the specific scrambling code parameter of the friend group, and user equipment that is not in the friend group cannot descramble the discovery signal sent by the first user equipment because the user equipment does not know the specific scrambling code parameter of the group; therefore, the user equipment that is not in the friend group cannot discover the first user equipment.

That first user equipment determines a value of a scrambling code parameter in S110 includes: determining, by the first user equipment, a value of the common scrambling code parameter and/or a value of the specific scrambling code parameter, where the first user equipment may determine the value of the common scrambling code parameter and/or the value of the specific scrambling code parameter in multiple manners. However, this embodiment of the present invention is not limited thereto.

In this embodiment of the present invention, the to-be-sent bit may be specifically one or more bits, and the to-be-sent bit may carry a discovery signal or to-be-sent data. However, this embodiment of the present invention is not limited thereto. Optionally, in S120, the first user equipment may perform data channel scrambling. Specifically, the first user equipment may generate a scrambling code sequence according to the value of the scrambling code parameter, and scramble the to-be-sent bit by using the scrambling code sequence. Optionally, in another embodiment, in S120, the first user equipment may also perform CRC scrambling. Specifically, the first user equipment may use, as a scrambling code sequence, the value of the scrambling code parameter or a value obtained after the value of the scrambling code parameter is processed, to scramble a CRC bit of the to-be-sent bit. However, this embodiment of the present invention is not limited thereto.

When the to-be-sent bit in this embodiment of the present invention carries a discovery signal, this embodiment of the present invention may be applied to an open discovery scenario and a controlled discovery scenario. In the open discovery scenario, the scrambling code parameter may include only the common scrambling code parameter, and the discovery signal is scrambled according to the value of the common scrambling code parameter, so that more adjacent UEs can descramble the discovery signal sent by the first user equipment. In the controlled discovery scenario, the scrambling code parameter may include only the specific scrambling code parameter or include the specific scrambling code parameter and the common scrambling code parameter, and the discovery signal is scrambled according to the value of the specific scrambling code parameter or according to the value of the specific scrambling code parameter and the value of the common scrambling code parameter, so that only adjacent user equipment that has a further association relationship with the first user equipment can descramble the discovery signal sent by the first user equipment. The adjacent user equipment that has a further association relationship with the first user equipment can learn the value of the specific scrambling code parameter of the first user equipment, where the association relationship may depend on an objective of sending the discovery signal by the first user equipment, that is, the first user equipment wants which adjacent user equipment to descramble the discovery signal, for example, adjacent user equipment that belongs to a same user group as the first user equipment, or adjacent user equipment that belongs to a same service type as the first user equipment, which is not limited in this embodiment of the present invention.

In this embodiment of the present invention, if the scrambling code parameter includes the common scrambling code parameter, that first user equipment determines a value of a scrambling code parameter may include: determining, by the first user equipment, the value of the common scrambling code parameter. Optionally, step S110 may be specifically implemented in the following manners:

Manner 1: The first user equipment determines the value of the common scrambling code parameter according to a D2D synchronization signal.

Manner 2: The first user equipment determines the value of the common scrambling code parameter according to a primary D2D synchronization channel PD2DSCH.

Manner 3: The first user equipment determines a cluster identifier of a D2D cluster to which the first user equipment belongs as the value of the common scrambling code parameter.

Specifically, in Manner 1, the first user equipment may detect the D2D synchronization signal, where the D2D synchronization signal may be sent by a cluster head of a D2D cluster to which the first user equipment belongs, or may be sent by a base station, which is not limited in this embodiment of the present invention. When detecting the D2D synchronization signal, the first user equipment acquires the value of the common scrambling code parameter from the D2D synchronization signal. Optionally, the first user equipment may use a number of the detected D2D synchronization signal as the value of the common scrambling code parameter, and correspondingly, Manner 1 may be specifically that the first user equipment determines the number of the D2D synchronization signal as the value of the common scrambling code parameter.

Optionally, in another embodiment, the D2D synchronization signal may include a primary D2D synchronization signal (English full name: Primary Device to Device Synchronization Signal, English abbreviation: PD2DSS) and a secondary D2D synchronization signal (English full name: Secondary Device to Device Synchronization Signal, English abbreviation: SD2DSS), and correspondingly, Manner 1 may be specifically that the first user equipment determines the value of the common scrambling code parameter according to the PD2DSS and the SD2DSS.

The first user equipment may separately detect the PD2DSS and the SD2DSS, and determine the value of the common scrambling code parameter according to the detected PD2DSS and SD2DSS. Optionally, the first user equipment may determine the value $N_{D2D}^{comm}$ of the common scrambling code parameter according to the following formula:

$$N_{D2D}^{comm}=3 \times N_{SD2DSS}+N_{PD2DSS} \quad (1), \text{where}$$

$N_{SD2DSS}$ is a number of the SD2DSS, and $N_{PD2DSS}$ is a number of the PD2DSS. Optionally, the first user equipment may further determine the value of the common scrambling code parameter by using another formula, which is not limited in this embodiment of the present invention.

In Manner 2, the first user equipment may acquire the value of the common scrambling code parameter on a specific time-frequency resource of the D2D synchronization channel (English full name: Primary Device to Device Synchronization Channel, English abbreviation: PD2DSCH), which is not limited in this embodiment of the present invention.

In Manner 3, the first user equipment may use the cluster identifier of the D2D cluster to which the first user equipment belongs as the value of the common scrambling code parameter. However, this embodiment of the present invention is not limited thereto.

Optionally, in another embodiment, if the scrambling code parameter includes the specific scrambling code parameter, that first user equipment determines a value of a scrambling code parameter may include: determining, by the first user equipment, the value of the specific scrambling code parameter. The first user equipment may determine the specific scrambling code parameter of the first user equipment in multiple manners. In a preferred embodiment, the first user equipment may determine the value of the specific scrambling code parameter of the first user equipment according to at least one of a D2D identifier of the first user equipment, a D2D group identifier of the first user equipment, or a service type identifier of the first user equipment, and correspondingly, step S110 may further be implemented in the following manner:

Manner 4: The first user equipment determines the value of the specific scrambling code parameter according to at least one of a D2D identifier of the first user equipment, a D2D group identifier of the first user equipment, or a service type identifier of the first user equipment.

Optionally, Manner 4 may be specifically implemented in the following ways:

Way 1: The first user equipment uses the D2D identifier of the first user equipment, the D2D group identifier of the first user equipment, or the service type identifier of the first user equipment as the value of the specific scrambling code parameter.

The D2D group identifier of the first user equipment may be a D2D user group identifier of the first user equipment, but this embodiment of the present invention is not limited thereto.

Way 2: The first user equipment performs an operation on the at least one of the D2D identifier of the first user equipment, the D2D group identifier of the first user equipment, or the service type identifier of the first user equipment according to an operation rule, and uses a value obtained from the operation as the value of the specific scrambling code parameter.

The operation rule may be represented by using a function such as a hash function or a truncate function. If the function is the truncate function, the truncate function is used to truncate an identifier. Specifically, the truncate function may truncate an identifier from a front end to a back end, truncate an identifier from a back end to a front end, or truncate an identifier from a middle part, which is not limited in this embodiment of the present invention.

It should be noted that the hash function (English full name: Hash Function) involved in this specification is also referred to as a hash function.

Preferably, Way 2 may be specifically that the first user equipment uses the D2D identifier of the first user equipment, the D2D group identifier of the first user equipment, or the service type identifier of the first user equipment as an output value, substitutes the output value into the hash function, and uses an output value of the hash function as the value of the specific scrambling code parameter; or the first user equipment uses the D2D identifier of the first user equipment, the D2D group identifier of the first user equipment, or the service type identifier of the first user equipment as an output value, substitutes the output value into the truncate function, and uses an output value of the truncate function as the value of the specific scrambling code parameter. However, this embodiment of the present invention is not limited thereto.

Optionally, in another embodiment, if the D2D cluster to which the first user equipment belongs is centrally controlled by the base station, the first user equipment may also determine the value of the common scrambling code parameter and/or the specific scrambling code parameter of the first user equipment according to indication information sent by the base station. However, if the D2D cluster to which the first user equipment belongs is controlled by a cluster head in a distributed manner, the first user equipment may also determine the value of the common scrambling code parameter and/or the specific scrambling code parameter of the first user equipment according to indication information sent by the cluster head. Correspondingly, step S110 may also be implemented in a fifth manner, and Manner 5 includes the following two steps:

Step 1: The first user equipment receives indication information sent by the base station or the cluster head of the D2D cluster to which the first user equipment belongs, where the indication information is used to indicate the value of the scrambling code parameter.

Step 2: The first user equipment determines the value of the scrambling code parameter according to the indication information.

Specifically, the indication information may be physical layer signaling or higher layer signaling, for example, the indication information is discovery signal paging signaling or radio resource control (English full name: Radio Resource Control, English abbreviation: RRC) dedicated signaling. The indication information may explicitly or implicitly indicate the value of the scrambling code parameter, where the value of the scrambling code parameter may be specifically the value of the common scrambling code parameter and/or the value of the specific scrambling code parameter, for example, the indication information may include the value of the specific scrambling code parameter and/or the value of the common scrambling code parameter;

or the indication information includes related information of the value of the specific scrambling code parameter and/or the value of the common scrambling code parameter, and the first user equipment determines the value of the specific scrambling code parameter and/or the value of the common scrambling code parameter according to the related information. However, this embodiment of the present invention is not limited thereto.

Figure 2:
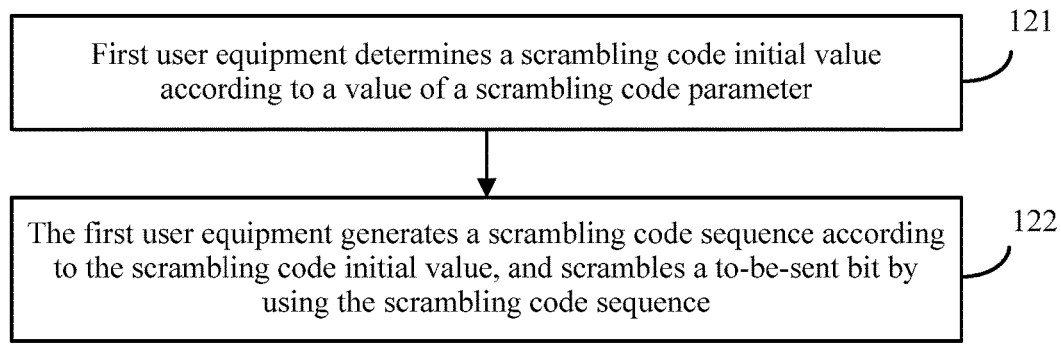
FIG. 2 is another schematic flowchart of a D2D communication method according to an embodiment of the present invention.

In this embodiment of the present invention, the first user equipment may perform data channel scrambling on the to-be-sent bit. Correspondingly, as shown in FIG. 2, that the first user equipment scrambles a to-be-sent bit according to the value of the scrambling code parameter in S120 includes: S121. The first user equipment determines a scrambling code initial value according to the value of the scrambling code parameter.

S122. The first user equipment generates a scrambling code sequence according to the scrambling code initial value, and scrambles the to-be-sent bit by using the scrambling code sequence.

Specifically, in S122, the first user equipment may generate a CRC bit of the to-be-sent bit, and use the to-be-sent bit and the CRC bit as an actually sent bit; then, the first user equipment may scramble the actually sent bit by using the scrambling code sequence. However, this embodiment of the present invention is not limited thereto.

In this embodiment of the present invention, the first user equipment may determine the scrambling code initial value in multiple manners. Preferably, step S121 may be implemented in the following implementation manners:

Implementation manner 1: If the scrambling code parameter includes the common scrambling code parameter, the first user equipment determines the value of the common scrambling code parameter as the scrambling code initial value.

Implementation manner 2: If the scrambling code parameter includes the specific scrambling code parameter, the first user equipment determines the value of the specific scrambling code parameter as the scrambling code initial value.

Implementation manner 3: The first user equipment determines the scrambling code initial value according to the value of the scrambling code parameter and a current timeslot number.

In Implementation manner 3, the value of the scrambling code parameter may be specifically the value of the common scrambling code parameter and/or the value of the specific scrambling code parameter. The current timeslot number may be a number of a timeslot occupied when the first user equipment sends the scrambled to-be-sent bit. Optionally, the current timeslot number may be a number of the timeslot, in a radio frame, occupied by the first user equipment, and a value of the current timeslot number may be any value from 0 to 19. However, this embodiment of the present invention is not limited thereto. Optionally, in Implementation manner 3, the scrambling code initial value $c_{init}$ may be determined by using the following formula:

$$c_{init} = \left(\left\lfloor \frac{n_s}{2} \right\rfloor + 1\right) \times (2 \times N_{D2D} + 1) \times 2^9 + N_{D2D}, \text{ or} \quad (2)$$

$$c_{init} = \left\lfloor \frac{n_s}{2} \right\rfloor \times 2^9 + N_{D2D}, \quad (3)$$

where $n_s$ is the current timeslot number, and $N_{D2D}$ is the value of the common scrambling code parameter or the value of the specific scrambling code parameter.

Optionally, in another embodiment, in Implementation manner 3, the scrambling code initial value $c_{init}$ may be determined by using the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or} \quad (4)$$

$$c_{init} = N_{D2D}^{spec} \times 2^{14} + \left\lfloor \frac{n_s}{2} \right\rfloor \times 2^9 + N_{D2D}^{comm}, \quad (5)$$

where comm $n_s$ is the current timeslot number, $N_{D2D}^{comm}$ is the value of the common scrambling code parameter, and $N_{D2D}^{spec}$ is the value of the specific scrambling code parameter.

Optionally, in Implementation manner 3, the scrambling code initial value may further be determined by using another formula, and this embodiment of the present invention is not limited thereto.

Optionally, in another embodiment, the first user equipment may further perform CRC scrambling on the to-be-sent bit, that is, the first user equipment scrambles, by using the value of the scrambling code parameter, the CRC bit generated according to the to-be-sent bit. Optionally, in some specific situations, for example, when a quantity of bits corresponding to the value of the scrambling code parameter exceeds a quantity of CRC bits that need to be scrambled, that is, the quantity of bits corresponding to the value of the scrambling code parameter is greater than 24, the first user equipment may divide the value of the scrambling code parameter into at least two scrambling code segments, and scramble the to-be-sent bit by using the at least two scrambling code segments, where a quantity of the at least two scrambling code segments may be determined according to an accrual need, for example, the quantity of the at least two scrambling code segments may depend on the quantity of bits corresponding to the value of the scrambling code parameter and the quantity of CRC bits, so that a quantity of bits corresponding to each scrambling code segment is less than or equal to the quantity of CRC bits. However, this embodiment of the present invention is not limited thereto.

Figure 3:
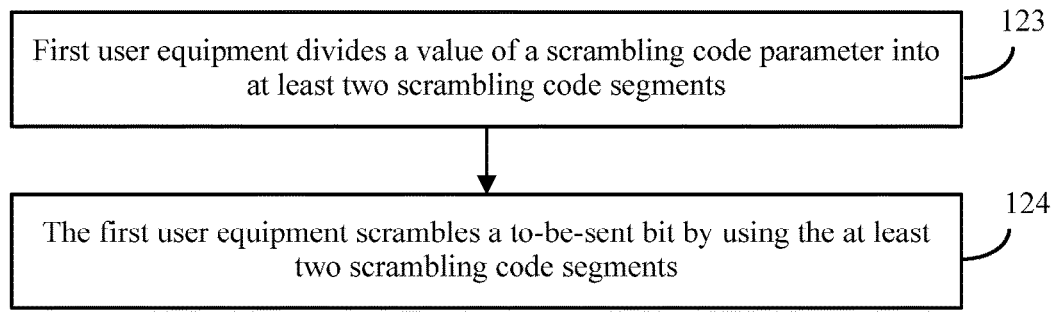
FIG. 3 is still another schematic flowchart of a D2D communication method according to an embodiment of the present invention.

Optionally, as shown in FIG. 3, that the first user equipment scrambles a to-be-sent bit according to the value of the scrambling code parameter in S120 includes:

S123. The first user equipment divides the value of the scrambling code parameter into at least two scrambling code segments.

S124. The first user equipment scrambles the to-be-sent bit by using the at least two scrambling code segments.

Optionally, in S124, the first user equipment may generate at least two CRC bits for the to-be-sent bit, and scramble, by using the at least two scrambling code segments, the CRC bits generated according to the to-be-sent bit. However, this embodiment of the present invention is not limited thereto.

Optionally, that the first user equipment scrambles the to-be-sent bit by using the at least two scrambling code segments in S124 includes: S1241a. The first user equipment divides the to-be-sent bit into at least two to-be-sent bit segments.

S1242a. The first user equipment generates a cyclic redundancy code check (CRC) bit of each to-be-sent bit segment in the at least two to-be-sent bit segments.

S1243a. The first user equipment separately scrambles CRC bits of the at least two to-be-sent bit segments by using the at least two scrambling code segments.

Specifically, the first user equipment may generate the CRC bit for each to-be-sent bit segment in the at least two to-be-sent bit segments, place the generated CRC bit behind a corresponding to-be-sent bit segment, and use the to-be-sent bit segment and the CRC bit as an actually sent bit segment. Optionally, a quantity of the to-be-sent bit segments may be equal to a quantity of the scrambling code segments, and the first user equipment may scramble the CRC bits of the at least two to-be-sent bit segments by using the at least two scrambling code segments in one-to-one correspondence.

Optionally, a quantity of the to-be-sent bit segments may also be greater than a quantity of the scrambling code segments, and in this case, the first user equipment may scramble CRC bits of some to-be-sent bit segments in the at least two to-be-sent bit segments by using the at least two scrambling code segments, and does not scramble CRC bits of the other to-be-sent bit segments, or scramble CRC bits of the other to-be-sent bit segments by using a segment filled with a fixed value, or scramble CRC bits of the other to-be-sent bit segments by repeatedly using at least one scrambling code segment in the at least two scrambling code segments. However, this embodiment of the present invention is not limited thereto.

Figure 4:
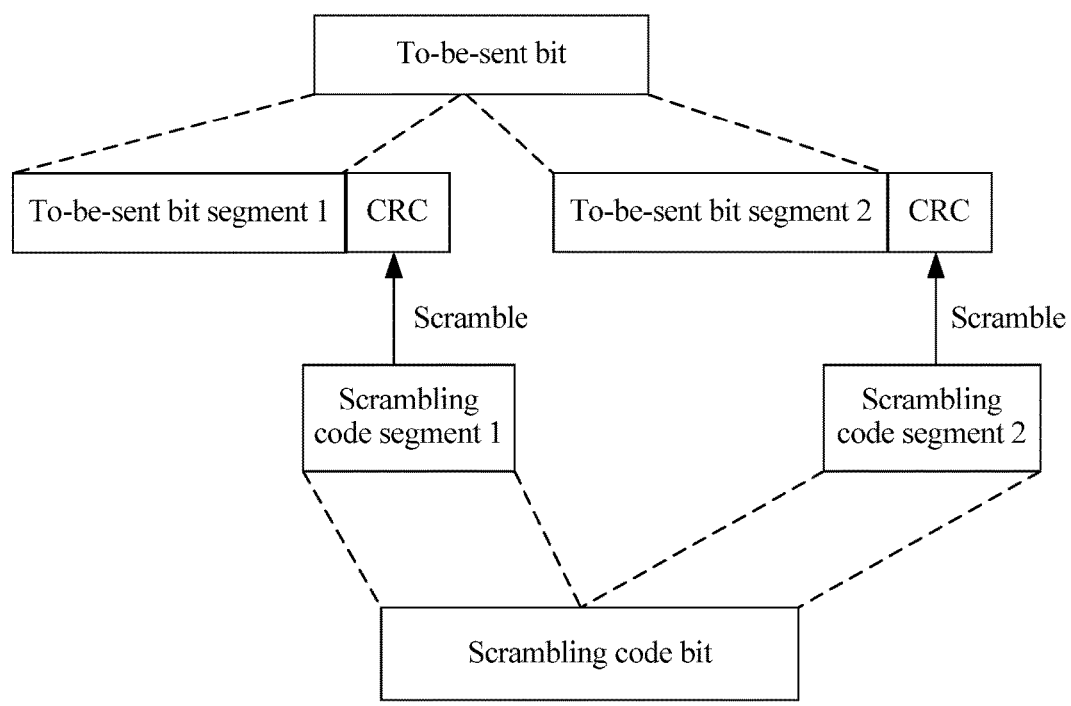
FIG. 4 is a schematic diagram of scrambling a to-be-sent bit in a D2D communication method according to an embodiment of the present invention.

FIG. 4 shows a schematic diagram of performing CRC scrambling by the first user equipment according to an embodiment of the present invention. As shown in FIG. 4, the first user equipment divides a bit (that is, a scrambling code bit) corresponding to the value of the scrambling code parameter into two scrambling code segments: a scrambling code segment 1 and a scrambling code segment 2. Correspondingly, the first user equipment divides the to-be-sent bit into two to-be-sent bit segments: a to-be-sent bit segment 1 and a to-be-sent bit segment 2, and the first user equipment separately generates CRC bits for the to-be-sent bit segment 1 and the to-be-sent bit segment 2. Then, the first user equipment scrambles the CRC bit of the to-be-sent bit segment 1 by using the scrambling code segment 1, and scrambles the CRC bit of the to-be-sent bit segment 2 by using the scrambling code segment 2.

Optionally, in another embodiment, that the first user equipment scrambles the to-be-sent bit by using the at least two scrambling code segments in S124 includes:

S1241b. The first user equipment generates a CRC bit of the to-be-sent bit, and uses the to-be-sent bit and the CRC bit of the to-be-sent bit as a to-be-scrambled bit.

S1242b. The first user equipment divides the to-be-scrambled bit into at least two to-be-scrambled bit segments.

S1243b. The first user equipment generates a CRC bit of each to-be-scrambled bit segment in the at least two to-be-scrambled bit segments.

S1244b. The first user equipment separately scrambles CRC bits of the at least two to-be-scrambled bit segments by using the at least two scrambling code segments.

Specifically, the first user equipment may place the CRC of the to-be-sent bit behind the to-be-sent bit, and in this case, the to-be-sent bit and the CRC bit form the to-be-scrambled bit together. Then, the first user equipment divides the to-be-scrambled bit into at least two to-be-scrambled bit segments; and the first user equipment may generate the CRC bit for each to-be-scrambled bit segment in the at least two to-be-scrambled bit segments, place the generated CRC bit behind a corresponding to-be-scrambled bit segment, and use the to-be-scrambled bit segment and the CRC bit as an actually sent bit segment. Optionally, a quantity of the to-be-scrambled bit segments may be equal to a quantity of the scrambling code segments, and the first user equipment may scramble the CRC bits of the at least two to-be-scrambled bit segments by using the at least two scrambling code segments in one-to-one correspondence. Optionally, a quantity of the to-be-scrambled bit segments may also be greater than a quantity of the scrambling code segments, and in this case, the first user equipment may scramble CRC bits of some to-be-scrambled bit segments in the at least two to-be-scrambled bit segments by using the at least two scrambling code segments, and does not scramble CRC bits of the other to-be-scrambled bit segments, or scramble CRC bits of the other to-be-scrambled bit segments by using a segment filled with a fixed value, or scramble CRC bits of the other to-be-scrambled bit segments by repeatedly using at least one scrambling code segment in the at least two scrambling code segments. However, this embodiment of the present invention is not limited thereto.

Figure 5:
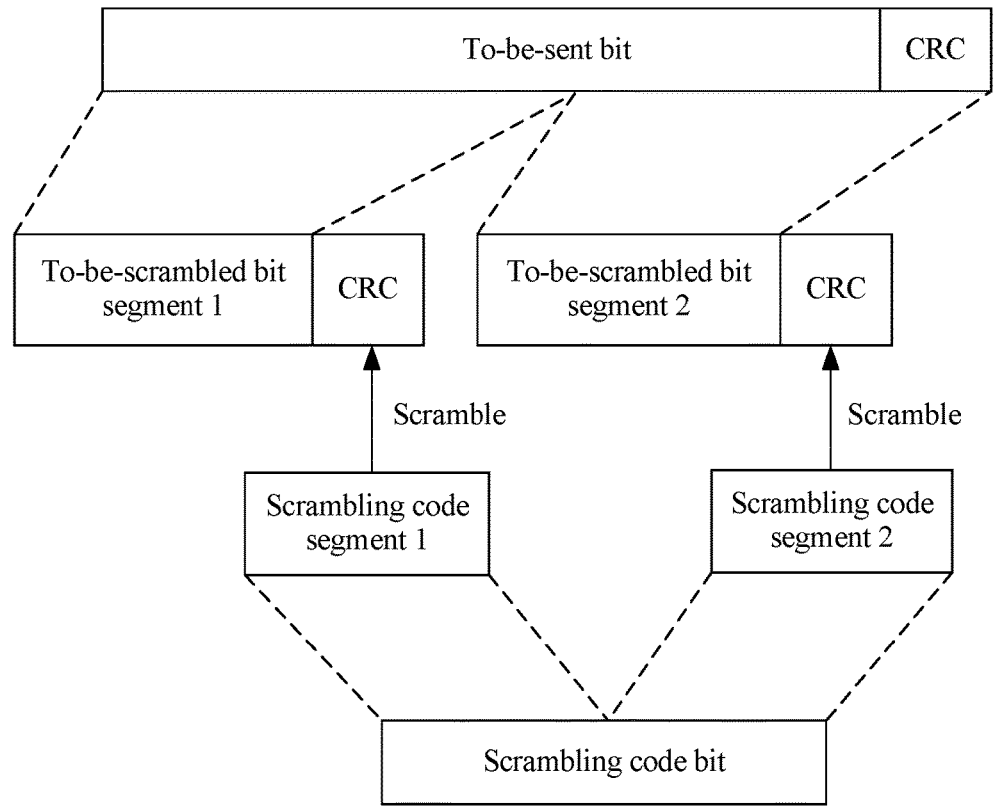
FIG. 5 is another schematic diagram of scrambling a to-be-sent bit in a D2D communication method according to an embodiment of the present invention.

FIG. 5 shows a schematic diagram of performing CRC scrambling by the first user equipment according to another embodiment of the present invention. As shown in FIG. 5, the first user equipment divides a bit (that is, a scrambling code bit) corresponding to the value of the scrambling code parameter into two scrambling code segments: a scrambling code segment 1 and a scrambling code segment 2. On the other hand, the first user equipment generates a CRC bit of the to-be-sent bit, and places the CRC bit behind the to-be-sent bit to form a to-be-scrambled bit. Then, the first user equipment divides the to-be-scrambled bit into two to-be-scrambled bit segments: a to-be-scrambled bit segment 1 and a to-be-scrambled bit segment 2, and the first user equipment separately generates CRC bits for the to-be-scrambled bit segment 1 and the to-be-scrambled bit segment 2. Then, the first user equipment scrambles the CRC bit of the to-be-scrambled bit segment 1 by using the scrambling code segment 1, and scrambles the CRC bit of the to-be-scrambled bit segment 2 by using the scrambling code segment 2.

In FIG. 4 and FIG. 5, elaboration is provided by using an example in which a quantity of the scrambling code segments is 2. Optionally, in this embodiment of the present invention, the quantity of the scrambling code segments may also be another value, and a quantity of CRC bits that need to be scrambled may be the same as or different from the quantity of the scrambling code segments, which is not limited in this embodiment of the present invention.

It should be understood that examples shown in FIG. 4 and FIG. 5 are used to help persons skilled in the art to better understand the embodiments of the present invention, but are not intended to limit the scope of the embodiments of the present invention. Apparently, persons skilled in the art can make various equivalent modifications or changes according to examples given in FIG. 4 and FIG. 5, and such modifications or changes also fall within the scope of the embodiments of the present invention.

Therefore, according to the D2D communication method in this embodiment of the present invention, a transmit end determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

With reference to FIG. 1 to FIG. 5, the D2D communication method according to an embodiment of the present invention is described above in detail from a perspective of a transmit end, and with reference to FIG. 6, a D2D communication method according to an embodiment of the present invention is described in detail in the following from a perspective of a receive end.

Figure 6:
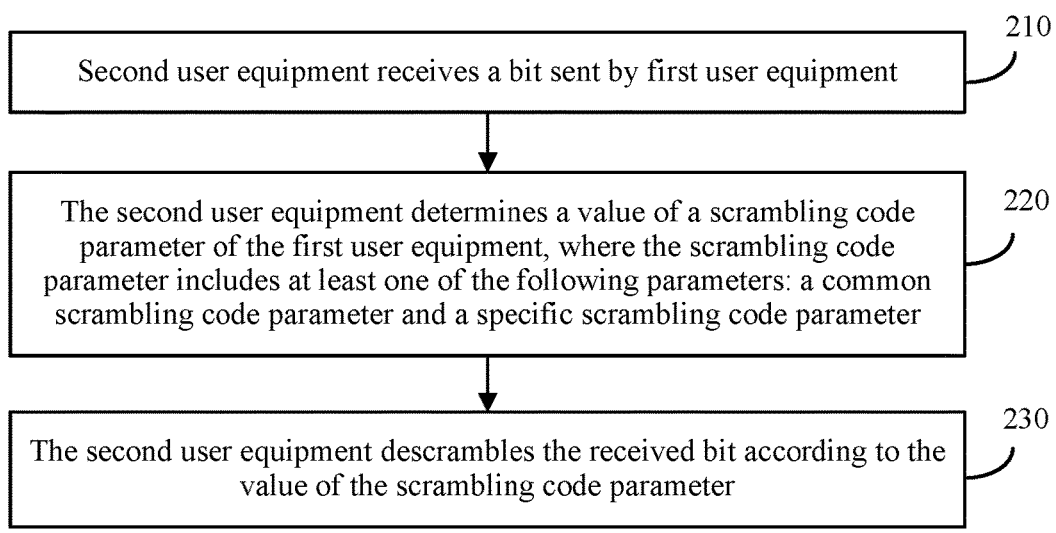
FIG. 6 is a schematic flowchart of a D2D communication method according to another embodiment of the present invention.

FIG. 6 shows a schematic flowchart of a D2D communication method 200 according to another embodiment of the present invention. As shown in FIG. 6, the method 200 includes:

S210. Second user equipment receives a bit sent by first user equipment.

S220. The second user equipment determines a value of a scrambling code parameter of the first user equipment, where the scrambling code parameter includes at least one of the following parameters: a common scrambling code parameter and a specific scrambling code parameter.

S230. The second user equipment descrambles the received bit according to the value of the scrambling code parameter.

Therefore, according to the D2D communication method in this embodiment of the present invention, a receive end determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

If the scrambling code parameter includes the common scrambling code parameter, optionally, a value of the common scrambling code parameter is determined by the first user equipment according to a D2D synchronization signal;
  a value of the common scrambling code parameter is determined by the first user equipment according to a primary D2D synchronization channel PD2DSCH; or
  a value of the common scrambling code parameter is a cluster identifier of a D2D cluster to which the first user equipment belongs.

Optionally, in another embodiment, if the scrambling code parameter includes the specific scrambling code parameter, a value of the specific scrambling code parameter is obtained after an operation is performed on at least one of a D2D identifier of the first user equipment, a D2D group identifier of the first user equipment, or a service type identifier of the first user equipment by using a function.

Optionally, the function may be f(x)=x, that is, an output value of the function is equal to an input value of the function; correspondingly, the value of the specific scrambling code parameter is the D2D identifier of the first user equipment;
  the value of the specific scrambling code parameter is the D2D group identifier of the first user equipment; or
  the value of the specific scrambling code parameter is the service type identifier of the first user equipment.

Optionally, in another embodiment, the function is a hash function or a truncate function.

In this embodiment of the present invention, the second user equipment and the first user equipment may belong to a same D2D cluster; in this case, the second user equipment may acquire the value of the scrambling code parameter of the first user equipment in multiple manners. Optionally, the second user equipment may determine the value of the scrambling code parameter of the first user equipment by using indication information sent by a control device. Specifically, if the D2D cluster is centrally controlled by a base station, the second user equipment may acquire the value of the scrambling code parameter by using indication information of the base station; if the D2D cluster is controlled by a cluster head in a distributed manner, the second user equipment may acquire the value of the scrambling code parameter from indication information sent by the cluster head of the D2D cluster. However, this embodiment of the present invention is not limited thereto.

Optionally, in an embodiment, in some specific scenarios, for example, when the second user equipment and the first user equipment belong to a same D2D cluster, and a manner of determining a value of a scrambling code parameter when each user equipment in the D2D cluster performs scrambling and descrambling may also be preset, the second user equipment may determine the value of the scrambling code parameter in a same manner as the first user equipment, for example, if the first user equipment determines the value of the common scrambling code parameter according to the D2D synchronization signal when performing scrambling, the second user equipment also determines the value of the common scrambling code parameter according to the D2D synchronization signal when performing descrambling.

Optionally, if the scrambling code parameter includes the common scrambling code parameter, step S220 may be specifically implemented in the following manners:

Manner 1: The second user equipment determines the value of the common scrambling code parameter according to the D2D synchronization signal.

Manner 2: The first user equipment determines the value of the common scrambling code parameter according to the primary D2D synchronization channel PD2DSCH.

Manner 3: The second user equipment determines a cluster identifier of a D2D cluster to which the second user equipment belongs as the value of the common scrambling code parameter.

Optionally, Manner 1 may be specifically that the second user equipment determines a number of the D2D synchronization signal as the value of the common scrambling code parameter.

Optionally, in another embodiment, the D2D synchronization signal may include a primary D2D synchronization signal PD2DSS and a secondary D2D synchronization signal SD2DSS, and correspondingly, Manner 1 may also be specifically that the second user equipment determines the value of the common scrambling code parameter according to the PD2DSS and the SD2DSS.

In a preferred embodiment, the value $N_{D2D}^{comm}$ of the common scrambling code parameter is determined by using the following formula:

$$N_{D2D}^{comm}=3\times N_{SD2DSS}+N_{PD2DSS} \qquad (6),\text{ where}$$

$N_{SD2DSS}$ is a number of the SD2DSS, and $N_{PD2DSS}$ is a number of the PD2DSS.

Optionally, in another embodiment, a D2D cluster to which the second user equipment belongs may also be different from a D2D cluster to which the first user equipment belongs; in this case, if a base station that provides a service to the first user equipment is the same as a base station that provides a service to the second user equipment, the second user equipment may determine the value of the scrambling code parameter by using indication information sent by the base station. However, this embodiment of the present invention is not limited thereto.

Optionally, in another embodiment, that the second user equipment determines a value of a scrambling code parameter of the first user equipment in S220 includes: S221. The second user equipment receives indication information sent by a base station or a cluster head of a D2D cluster to which the second user equipment belongs, where the indication information is used to indicate the value of the scrambling code parameter of the first user equipment.

S222. The second user equipment determines the value of the scrambling code parameter according to the indication information.

The indication information may explicitly or implicitly indicate the value of the scrambling code parameter, and the second user equipment may determine the value of the scrambling code parameter according to the indication information, where the value of the scrambling code parameter may be specifically the value of the common scrambling code parameter and/or the value of the specific scrambling code parameter. However, this embodiment of the present invention is not limited thereto.

Optionally, in another embodiment, when the first user equipment scrambles a to-be-sent bit, data channel scrambling or CRC scrambling may be used, and when the second user equipment descrambles the received bit, data channel descrambling or CRC descrambling may also be correspondingly used. If the second user equipment performs data channel descrambling on the received bit, optionally, that the second user equipment descrambles the received bit according to the value of the scrambling code parameter in S230 includes:

S231. The second user equipment determines a scrambling code initial value according to the value of the scrambling code parameter.

S232. The second user equipment generates a scrambling code sequence according to the scrambling code initial value, and descrambles the received bit by using the scrambling code sequence.

Optionally, step S231 may be implemented in the following implementation manners:

Implementation manner 1: The second user equipment determines the value of the common scrambling code parameter as the scrambling code initial value.

Implementation manner 2: The second user equipment determines the value of the specific scrambling code parameter as the scrambling code initial value.

Implementation manner 3: The second user equipment determines the scrambling code initial value according to the value of the scrambling code parameter and a current timeslot number.

In Implementation manner 3, the value of the scrambling code parameter may be specifically the value of the common scrambling code parameter and/or the value of the specific scrambling code parameter, and the current timeslot number may be a number of a timeslot occupied when the second user equipment receives the bit, where the timeslot of receiving the bit by the second user equipment is the same as a timeslot of sending the bit by the first user equipment, but this embodiment of the present invention is not limited thereto. Optionally, in Implementation manner 3, the scrambling code initial value $c_{init}$ may be determined by using the following formula:

$$c_{init} = \left(\left\lfloor \frac{n_s}{2} \right\rfloor + 1\right) \times (2 \times N_{D2D} + 1) \times 2^9 + N_{D2D}, \text{ or} \quad (7)$$

$$c_{init} = \left\lfloor \frac{n_s}{2} \right\rfloor \times 2^9 + N_{D2D}, \quad (8)$$

where $n_s$ is the current timeslot number, and $N_{D2D}$ is the value of the common scrambling code parameter or the value of the specific scrambling code parameter.

Optionally, in another embodiment, in Implementation manner 3, the scrambling code initial value $c_{init}$ may be determined by using the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or} \quad (9)$$

$$c_{init} = N_{D2D}^{spec} \times 2^{14} + \left\lfloor \frac{n_s}{2} \right\rfloor \times 2^9 + N_{D2D}^{comm}, \quad (10)$$

where $n_s$ is the current timeslot number, $N_{D2D}^{comm}$ is the value of the common scrambling code parameter, and $N_{D2D}^{spec}$ is the value of the specific scrambling code parameter.

Optionally, in Implementation manner 3, the scrambling code initial value may further be determined by using another formula, and this embodiment of the present invention is not limited thereto.

Optionally, in another embodiment, the second user equipment may also perform CRC descrambling on the received bit. Optionally, in some specific situations, for example, when a quantity of bits corresponding to the value of the scrambling code parameter exceeds a quantity of CRC bits that need to be descrambled, that is, the quantity of bits corresponding to the value of the scrambling code parameter is greater than 24, the first user equipment divides the value of the scrambling code parameter into multiple scrambling code segments to perform scrambling; and correspondingly, the second user equipment may also divide the value of the scrambling code parameter into multiple scrambling code segments, and descramble the received bit by using the multiple scrambling code segments.

Optionally, the bit received by the second user equipment includes at least two to-be-descrambled bit segments, and each to-be-descrambled bit segment in the at least two to-be-descrambled bit segments includes a data bit segment and a CRC bit.

Correspondingly, that the second user equipment descrambles the received bit by using the scrambling code sequence in S230 includes:

S233. The second user equipment divides the value of the scrambling code parameter into at least two scrambling code segments.

S234. The second user equipment separately descrambles CRC bits of the at least two to-be-descrambled bit segments by using the at least two scrambling code segments, to obtain at least two to-be-checked bit segments.

If the first user equipment performs scrambling in a manner shown in FIG. 4 or FIG. 6, the second user equipment may divide the value of the scrambling code parameter into two scrambling code segments: a scrambling code segment 1 and a scrambling code segment 2, and correspondingly divide the received bit into two bit segments: a bit segment 1 and a bit segment 2. Then, the second user equipment may descramble the bit segment 1 by using the scrambling code segment 1 to obtain a to-be-checked bit segment 1, and descramble the bit segment 2 by using the scrambling code segment 2 to obtain a to-be-checked bit segment 2. Referring to FIG. 4, it may be learned that the to-be-checked bit segment 1 is corresponding to a to-be-sent bit segment 1 and a CRC bit of the to-be-sent bit segment 1, and the to-be-checked bit segment 2 is corresponding to a to-be-sent bit segment 2 and a CRC bit of the to-be-sent bit segment 2, where a to-be-sent bit segment is a data bit segment.

Referring to FIG. 6, it may be learned that the to-be-checked bit segment 1 is corresponding to a to-be-scrambled bit segment 1 and a CRC bit of the to-be-sent bit segment 1, and the to-be-checked bit segment 2 is corresponding to a to-be-scrambled bit segment 2 and a CRC bit of the to-be-sent bit segment 2. However, this embodiment of the present invention is not limited thereto.

Optionally, in another embodiment, the method 200 further includes:

S240. The second user equipment performs CRC check on each to-be-checked bit segment in the at least two to-be-checked bit segments to obtain a data bit segment of each to-be-checked bit segment.

S250. The second user equipment cascades data bit segments of the at least two to-be-checked bit segments to obtain a data bit.

Specifically, if the first user equipment performs scrambling in a manner shown in FIG. 4, the second user equipment may separately perform CRC check on the to-be-checked bit segment 1 and the to-be-checked bit segment 2 to obtain the to-be-sent bit segment 1 and the to-be-sent bit segment 2. Then, the second user equipment cascades the to-be-sent bit segment 1 and the to-be-sent bit segment 2, so that the to-be-sent bit of the first user equipment may be obtained, where the to-be-sent data is the data bit; in this case, the data bit is an original data bit of the first user equipment.

Optionally, in another embodiment, if the first user equipment performs scrambling in a manner shown in FIG. 6, the second user equipment may separately perform CRC check on the to-be-checked bit segment 1 and the to-be-checked bit segment 2 to obtain the to-be-scrambled bit segment 1 and the to-be-scrambled bit segment 2. Then, the second user equipment cascades the to-be-scrambled bit segment 1 and the to-be-scrambled bit segment 2 to obtain a to-be-scrambled bit of the first user equipment, where the to-be-scrambled bit includes a to-be-sent bit and a CRC bit, and the to-be-sent bit is the data bit; and the second user equipment needs to perform CRC check again to obtain the to-be-sent bit, that is, an original data bit, of the first user equipment.

Optionally, in another embodiment, the data bit includes an original data bit and a CRC bit, and correspondingly, the method 200 further includes:

S260. The second user equipment performs CRC check on the data bit to obtain the original data bit.

Therefore, according to the D2D communication method in this embodiment of the present invention, a receive end determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

It should be understood that sequence numbers of the foregoing processes do not mean execution sequences. Execution sequences of the processes should be determined according to functions and internal logic of the processes, and shall not constitute any limitation on implementation processes of the embodiments of the present invention.

With reference to FIG. 1 to FIG. 6, the D2D communication methods according to the embodiments of the present invention are described above in detail, and with reference to FIG. 7 to FIG. 10, user equipment according to an embodiment of the present invention is described in the following.

Figure 7:
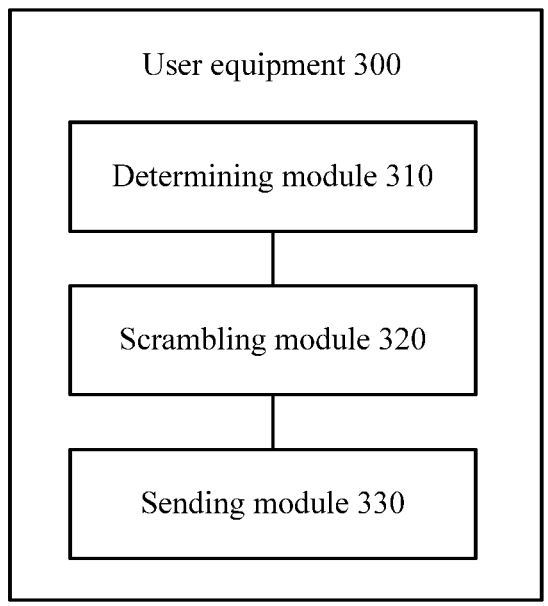
FIG. 7 is a schematic block diagram of user equipment according to an embodiment of the present invention.

FIG. 7 shows a schematic block diagram of user equipment 300 according to an embodiment of the present invention. As shown in FIG. 7, the user equipment 300 includes:

a determining module 310, configured to determine a value of a scrambling code parameter, where the scrambling code parameter includes at least one of the following parameters: a common scrambling code parameter and a specific scrambling code parameter;

a scrambling module 320, configured to scramble a to-be-sent bit according to the value that is of the scrambling code parameter and that is determined by the determining module 310; and a sending module 330, configured to send a to-be-sent bit scrambled by the scrambling module 320.

Therefore, the user equipment according to this embodiment of the present invention determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

Optionally, the scrambling code parameter includes the common scrambling code parameter, and correspondingly, the determining module 310 includes a first determining unit 311, where the first determining unit 311 determines a value of the common scrambling code parameter according to a D2D synchronization signal;

the first determining unit 311 is configured to determine a value of the common scrambling code parameter according to a primary D2D synchronization channel PD2DSCH; or the first determining unit 311 is configured to determine a cluster identifier of a D2D cluster to which the user equipment 300 belongs as a value of the common scrambling code parameter.

Optionally, in another embodiment, the first determining unit 311 is specifically configured to determine a number of the D2D synchronization signal as the value of the common scrambling code parameter.

Optionally, in another embodiment, the D2D synchronization signal includes a primary D2D synchronization signal PD2DSS and a secondary D2D synchronization signal SD2DSS, and correspondingly, the first determining unit 311 is specifically configured to determine the value of the common scrambling code parameter according to the PD2DSS and the SD2DSS.

Optionally, in another embodiment, the value $N_{D2D}^{comm}$ of the common scrambling code parameter is determined by using the following formula:

$$N_{D2D}^{comm} = 3 \times N_{SD2DSS} + N_{PD2DSS} \qquad (11), \text{where}$$

$N_{SD2DSS}$ is a number of the SD2DSS, and $N_{PD2DSS}$ is a number of the PD2DSS.

Optionally, in another embodiment, the scrambling code parameter includes the specific scrambling code parameter, and correspondingly, the determining module 310 includes:

a second determining unit 312, configured to determine a value of the specific scrambling code parameter according to at least one of a D2D identifier of the user equipment 300, a D2D group identifier of the user equipment 300, or a service type identifier of the user equipment 300.

Optionally, in another embodiment, the second determining unit 312 is specifically configured to:
  determine the D2D identifier of the user equipment 300 as the value of the specific scrambling code parameter;
  determine the D2D group identifier of the user equipment 300 as the value of the specific scrambling code parameter; or
  determine the service type identifier of the user equipment 300 as the value of the specific scrambling code parameter.

Optionally, in another embodiment, the second determining unit 312 is specifically configured to:
  determine the value of the specific scrambling code parameter according to the at least one of the D2D identifier of the user equipment 300, the D2D group identifier of the user equipment 300, or the service type identifier of the user equipment 300, and a hash function; or
  determine the value of the specific scrambling code parameter according to the at least one of the D2D identifier of the user equipment 300, the D2D group identifier of the user equipment 300, or the service type identifier of the user equipment 300, and a truncate function.

Optionally, in another embodiment, the determining module 310 includes:
  a receiving unit 313, configured to receive indication information sent by a base station or a cluster head of a D2D cluster to which the user equipment 300 belongs, where the indication information is used to indicate the value of the scrambling code parameter; and
  a third determining unit 314, configured to determine the value of the scrambling code parameter according to the indication information received by the receiving unit 313.

Optionally, the value of the scrambling code parameter may be specifically the value of the common scrambling code parameter and/or the value of the specific scrambling code parameter.

Optionally, in another embodiment, the scrambling module 320 includes:
  a determining unit 321, configured to determine a scrambling code initial value according to the value that is of the scrambling code parameter and that is determined by the determining module 310; and
  a first scrambling unit 322, configured to: generate a scrambling code sequence according to the scrambling code initial value determined by the determining unit 321, and scramble the to-be-sent bit by using the scrambling code sequence.

Optionally, in another embodiment, the determining unit 321 is specifically configured to:
  determine the value of the common scrambling code parameter as the scrambling code initial value; or
  determine the value of the specific scrambling code parameter as the scrambling code initial value.

Optionally, in another embodiment, the determining unit 321 is specifically configured to determine the scrambling code initial value according to a current timeslot number and the value that is of the scrambling code parameter and that is determined by the determining module 310.

Optionally, in another embodiment, the determining unit 321 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D} + 1) \times 2^9 + N_{D2D}, \text{ or} \quad (12)$$

$$c_{init} = \left\lfloor \frac{n_s}{2} \right\rfloor \times 2^9 + N_{D2D}, \quad (13)$$

where
  $n_s$ is the current timeslot number, and $N_{D2D}$ is the value of the common scrambling code parameter or the value of the specific scrambling code parameter.

Optionally, in another embodiment, the determining unit 321 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or} \quad (14)$$

$$c_{init} = N_{D2D}^{spec} \times 2^{14} + \left\lfloor \frac{n_s}{2} \right\rfloor \times 2^9 + N_{D2D}^{comm}, \quad (15)$$

where
  $n_s$ is the current timeslot number, $N_{D2D}^{comm}$ is the value of the common scrambling code parameter, and $N_{D2D}^{spec}$ is the value of the specific scrambling code parameter.

Optionally, in another embodiment, the scrambling module 320 includes:
  a segmentation unit 323, configured to divide the value that is of the scrambling code parameter and that is determined by the determining module 310 into at least two scrambling code segments; and
  a second scrambling unit 324, configured to scramble the to-be-sent bit by using the at least two scrambling code segments divided by the segmentation unit 323.

Optionally, in another embodiment, the second scrambling unit 324 includes:
  a first generation subunit 324a, configured to: generate a cyclic redundancy code check (CRC) bit of the to-be-sent bit, and use the to-be-sent bit and the CRC bit of the to-be-sent bit as a to-be-scrambled bit;
  a first segmentation subunit 324b, configured to divide the to-be-scrambled bit generated by the first generation subunit 324a into at least two to-be-scrambled bit segments, where
  the first generation subunit 324a is further configured to generate a CRC bit of each to-be-scrambled bit segment in the at least two to-be-scrambled bit segments divided by the first segmentation subunit 324b; and
  a first scrambling subunit 324c, configured to separately scramble, by using the at least two scrambling code segments, CRC bits that are of the at least two to-be-scrambled bit segments and that are generated by the first generation subunit 324a.

Optionally, in another embodiment, the second scrambling unit 324 includes:
  a second segmentation subunit 324d, configured to divide the to-be-sent bit into at least two to-be-sent bit segments;
  a second generation subunit 324e, configured to generate a CRC bit of each to-be-sent bit segment in the at least two to-be-sent bit segments divided by the second segmentation subunit 324d; and a second scrambling subunit 324f, configured to separately scramble, by using the at least two scrambling code segments, CRC bits that are of the at least two to-be-sent bit segments and that are generated by the second generation subunit 324e.

The user equipment 300 according to this embodiment of the present invention may be corresponding to first user equipment in the D2D communication method according to the embodiments of the present invention, and the foregoing and other operations and/or functions of modules in the user equipment 300 are for implementing corresponding procedures of methods in FIG. 1 to FIG. 5. For brevity, details are not described herein.

Therefore, the user equipment according to this embodiment of the present invention determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

Figure 8:
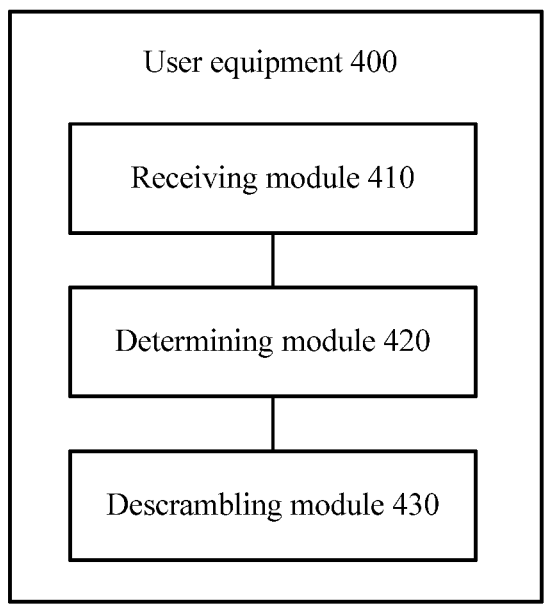
FIG. 8 is a schematic block diagram of user equipment according to another embodiment of the present invention.

FIG. 8 shows a schematic block diagram of user equipment 400 according to another embodiment of the present invention. As shown in FIG. 8, the user equipment 400 includes:
  a receiving module 410, configured to receive a bit sent by first user equipment;
  a determining module 420, configured to determine a value of a scrambling code parameter of the first user equipment, where the scrambling code parameter includes at least one of the following parameters: a common scrambling code parameter and a specific scrambling code parameter; and
  a descrambling module 430, configured to descramble, according to the value that is of the scrambling code parameter and that is determined by the determining module 420, the bit received by the receiving module 410.

Therefore, the user equipment according to this embodiment of the present invention determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

Optionally, if the scrambling code parameter includes the common scrambling code parameter, a value of the common scrambling code parameter is determined by the first user equipment according to a D2D synchronization signal;
  a value of the common scrambling code parameter is determined by the first user equipment according to a primary D2D synchronization channel PD2DSCH; or
  a value of the common scrambling code parameter is a cluster identifier of a D2D cluster to which the first user equipment belongs.

Optionally, in another embodiment, if the scrambling code parameter includes the specific scrambling code parameter, a value of the specific scrambling code parameter is obtained after an operation is performed on at least one of a D2D identifier of the first user equipment, a D2D group identifier of the first user equipment, or a service type identifier of the first user equipment by using a preset function.

Optionally, in another embodiment, the value of the specific scrambling code parameter is the D2D identifier of the first user equipment;
  the value of the specific scrambling code parameter is the D2D group identifier of the first user equipment; or
  the value of the specific scrambling code parameter is the service type identifier of the first user equipment.

Optionally, in another embodiment, the function is a hash function or a truncate function.

Optionally, in another embodiment, the determining module 420 includes a first determining unit 421, where
  the first determining unit 421 is configured to determine the value of the common scrambling code parameter according to the D2D synchronization signal;
  the first determining unit 421 is configured to determine the value of the common scrambling code parameter according to the primary D2D synchronization channel PD2DSCH; or
  the first determining unit 421 is configured to determine a cluster identifier of the D2D cluster to which the user equipment 400 belongs as the value of the common scrambling code parameter.

Optionally, in another embodiment, the first determining unit 421 is specifically configured to determine a number of the D2D synchronization signal as the value of the common scrambling code parameter.

Optionally, in another embodiment, the D2D synchronization signal includes a primary D2D synchronization signal PD2DSS and a secondary D2D synchronization signal SD2DSS, and
  correspondingly, the first determining unit 421 is specifically configured to determine the value of the common scrambling code parameter according to the PD2DSS and the SD2DSS.

Optionally, in another embodiment, the first determining unit 421 is specifically configured to determine the value $N_{D2D}^{comm}$ of the common scrambling code parameter according to the following formula:

$$N_{D2D}^{comm}=3\times N_{SD2DSS}+N_{PD2DSS} \quad (16),\text{ where}$$

$N_{SD2DSS}$ is a number of the SD2DSS, and $N_{PD2DSS}$ is a number of the PD2DSS.

Optionally, in another embodiment, the determining module 420 includes:
  a receiving unit 422, configured to receive indication information sent by a base station or a cluster head of a D2D cluster to which the user equipment 400 belongs, where the indication information is used to indicate the value of the scrambling code parameter of the first user equipment; and
  a second determining unit 423, configured to determine the value of the scrambling code parameter according to the indication information received by the receiving unit 422.

Optionally, in another embodiment, if the first user equipment scrambles a to-be-sent bit in a manner of data channel scrambling, the user equipment 400 may also correspondingly descramble the received bit in a manner of data channel descrambling, and the descrambling module 430 includes:
  a third determining unit 431, configured to determine a scrambling code initial value according to the value that is of the scrambling code parameter and that is determined by the determining module 420; and
  a first descrambling unit 432, configured to: generate a scrambling code sequence according to the scrambling code initial value determined by the third determining unit 431, and descramble the received bit by using the scrambling code sequence.

Optionally, in another embodiment, the third determining unit 431 is specifically configured to:
determine the value of the common scrambling code parameter as the scrambling code initial value; or
determine the value of the specific scrambling code parameter as the scrambling code initial value.

Optionally, in another embodiment, the third determining unit 431 is specifically configured to determine the scrambling code initial value according to a current timeslot number and the value that is of the scrambling code parameter and that is determined by the determining module 420.

Optionally, in another embodiment, the third determining unit 431 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D} + 1) \times 2^9 + N_{D2D}, \text{ or} \quad (17)$$

$$c_{init} = \left\lfloor \frac{n_s}{2} \right\rfloor \times 2^9 + N_{D2D}, \quad (18)$$

where
$n_s$ is the current timeslot number, and $N_{D2D}$ is the value of the common scrambling code parameter or the value of the specific scrambling code parameter.

Optionally, in another embodiment, the third determining unit 431 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or} \quad (19)$$

$$c_{init} = N_{D2D}^{spec} \times 2^{14} + \left\lfloor \frac{n_s}{2} \right\rfloor \times 2^9 + N_{D2D}^{comm}, \quad (20)$$

where
$n_s$ is the current timeslot number, $N_{D2D}^{comm}$ is the value of the common scrambling code parameter, and $N_{D2D}^{spec}$ is the value of the specific scrambling code parameter.

Optionally, in another embodiment, if the first user equipment scrambles a to-be-sent bit in a manner of CRC scrambling, the user equipment 400 may also descramble the received bit in a manner of CRC descrambling. Optionally, the bit received by the receiving module 410 includes at least two bit segments, and each bit segment in the at least two bit segments includes a data bit segment and a CRC bit; and correspondingly, the descrambling module 430 includes:
a segmentation unit 433, configured to divide the value that is of the scrambling code parameter and that is determined by the determining module 420 into at least two scrambling code segments; and
a second descrambling unit 434, configured to separately descramble CRC bits of the at least two bit segments by using the at least two scrambling code segments divided by the segmentation unit 433, to obtain at least two to-be-checked bit segments.

Optionally, in another embodiment, the user equipment 400 further includes:
a CRC check module 440, configured to perform CRC check on each to-be-checked bit segment in the at least two to-be-checked bit segments obtained by the second descrambling unit 434, to obtain a data bit segment of each to-be-checked bit segment; and
a cascading module 450, configured to cascade data bit segments of the at least two to-be-checked bit segments obtained by the CRC check module 440, to obtain a data bit.

Optionally, in another embodiment, the data bit obtained by the cascading module 450 includes an original data bit and a CRC bit, and correspondingly,
the CRC check module 440 is further configured to perform CRC check on the data bit obtained by the cascading module 450, to obtain the original data bit.

The user equipment 400 according to this embodiment of the present invention may be corresponding to second user equipment in the D2D communication method according to the embodiments of the present invention, and the foregoing and other operations and/or functions of modules in the user equipment 400 are for implementing corresponding procedures of methods in FIG. 6. For brevity, details are not described herein.

Therefore, the user equipment according to this embodiment of the present invention determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

Figure 9:
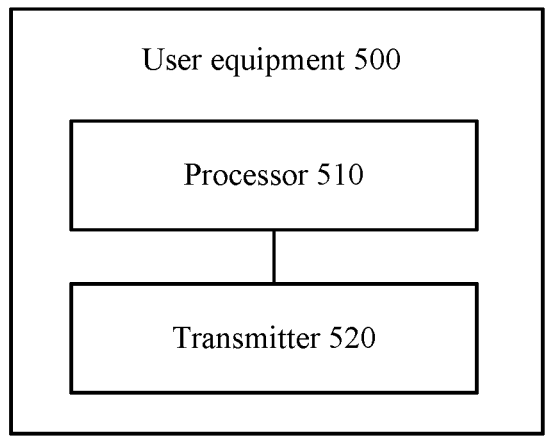
FIG. 9 is a schematic block diagram of user equipment according to still another embodiment of the present invention.

FIG. 9 shows a schematic block diagram of user equipment 500 according to still another embodiment of the present invention. As shown in FIG. 9, the user equipment 500 includes a processor 510 and a transmitter 520.

The processor 510 is configured to: determine a value of a scrambling code parameter, where the scrambling code parameter includes at least one of the following parameters: a common scrambling code parameter and a specific scrambling code parameter; and scramble a to-be-sent bit according to the value of the scrambling code parameter.

The transmitter 520 is configured to send a to-be-sent bit scrambled by the processor 510.

Therefore, the user equipment according to this embodiment of the present invention determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

It should be understood that, in this embodiment of the present invention, the processor 510 may be a central processing unit (English full name: Central Processing Unit, English abbreviation: CPU), or the processor 510 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The user equipment 500 may also include a memory, where the memory may include a read-only memory and a random access memory, and provide data and an instruction for the processor 510. A part of the memory may further include a nonvolatile random access memory. For example, the memory may further store information about a device type.

In an implementation process, steps in the foregoing methods may be completed by means of an integrated logic circuit of hardware in the processor 510 or an instruction in a form of software. Steps in the methods disclosed with reference to the embodiments of the present invention may be directly executed and completed by a hardware processor, or may be executed and completed by using a combination of hardware and software modules in the processor. The software module may be located in a mature storage medium in the field, such as a random memory, a flash memory, a read-only memory, a programmable read-only memory, an electrically-erasable programmable memory, or a register. The storage medium is located in the memory.

The processor 510 reads information in the memory and completes the steps in the foregoing methods in combination with hardware of the processor 510. To avoid repetition, details are not described herein.

Optionally, the scrambling code parameter includes the common scrambling code parameter, and correspondingly, the processor 510 is specifically configured to:
  determine a value of the common scrambling code parameter according to a D2D synchronization signal;
  determine a value of the common scrambling code parameter according to a primary D2D synchronization channel PD2DSCH; or
  determine a cluster identifier of a D2D cluster to which the user equipment 500 belongs as a value of the common scrambling code parameter.

Optionally, in another embodiment, the processor 510 is specifically configured to determine a number of the D2D synchronization signal as the value of the common scrambling code parameter.

Optionally, in another embodiment, the D2D synchronization signal includes a primary D2D synchronization signal PD2DSS and a secondary D2D synchronization signal SD2DSS, and
  correspondingly, the processor 510 is specifically configured to determine the value of the common scrambling code parameter according to the PD2DSS and the SD2DSS.

Optionally, in another embodiment, the value $N_{D2D}^{comm}$ of the common scrambling code parameter is determined by using the following formula:

$$N_{D2D}^{comm}=3\times N_{SD2DSS}+N_{PD2DSS} \quad (21),\text{ where}$$

$N_{SD2DSS}$ is a number of the SD2DSS, and $N_{PD2DSS}$ is a number of the PD2DSS.

Optionally, in another embodiment, the scrambling code parameter includes the specific scrambling code parameter, and correspondingly, the processor 510 is specifically configured to:
  determine a value of the specific scrambling code parameter according to at least one of a D2D identifier of the user equipment 500, a D2D group identifier of the user equipment 500, or a service type identifier of the user equipment 500.

Optionally, in another embodiment, the processor 510 is specifically configured to:
  determine the D2D identifier of the user equipment 500 as the value of the specific scrambling code parameter;
  determine the D2D group identifier of the user equipment 500 as the value of the specific scrambling code parameter; or
  determine the service type identifier of the user equipment 500 as the value of the specific scrambling code parameter.

Optionally, in another embodiment, the processor 510 is specifically configured to:
  determine the value of the specific scrambling code parameter according to the at least one of the D2D identifier of the user equipment 500, the D2D group identifier of the user equipment 500, or the service type identifier of the user equipment 500, and a hash function; or
  determine the value of the specific scrambling code parameter according to the at least one of the D2D identifier of the user equipment 500, the D2D group identifier of the user equipment 500, or the service type identifier of the user equipment 500, and a truncate function.

Optionally, in another embodiment, the user equipment 500 further includes:
  a receiver 530, configured to receive indication information sent by a base station or a cluster head of a D2D cluster to which the user equipment 500 belongs, where the indication information is used to indicate the value of the scrambling code parameter; and
  correspondingly, the processor 510 is specifically configured to determine the value of the scrambling code parameter according to the indication information received by the receiver 530.

Optionally, the value of the scrambling code parameter may be specifically the value of the common scrambling code parameter and/or the value of the specific scrambling code parameter.

Optionally, in another embodiment, the processor 510 is specifically configured to: determine a scrambling code initial value according to the value of the scrambling code parameter, generate a scrambling code sequence according to the scrambling code initial value, and scramble the to-be-sent bit by using the scrambling code sequence.

Optionally, in another embodiment, the processor 510 is specifically configured to:
  determine the value of the common scrambling code parameter as the scrambling code initial value; or
  determine the value of the specific scrambling code parameter as the scrambling code initial value.

Optionally, in another embodiment, the processor 510 is specifically configured to determine the scrambling code initial value according to the value of the scrambling code parameter and a current timeslot number.

Optionally, in another embodiment, the processor 510 is specifically configured to determine the scrambling code initial value $c_{init}$ according to the following formula:

$$c_{init} = \left(\left\lfloor\frac{n_s}{2}\right\rfloor+1\right)\times(2\times N_{D2D}+1)\times 2^9 + N_{D2D}, \text{ or} \quad (22)$$

$$c_{init} = \left\lfloor\frac{n_s}{2}\right\rfloor\times 2^9 + N_{D2D}, \quad (23)$$

where
  $n_s$ is the current timeslot number, and $N_{D2D}$ is the value of the common scrambling code parameter or the value of the specific scrambling code parameter.

Optionally, in another embodiment, the processor 510 is specifically configured to determine the scrambling code initial value $c_{init}$ according to the following formula:

$$c_{init} = \left(\left\lfloor\frac{n_s}{2}\right\rfloor + 1\right) \times (2 \times N_{D2D}^{comm} + 1) \times 2^{16} + N_{D2D}^{spec}, \text{ or} \quad (24)$$

$$c_{init} = N_{D2D}^{spec} \times 2^{14} + \left\lfloor\frac{n_s}{2}\right\rfloor \times 2^9 + N_{D2D}^{comm}, \quad (25)$$

where $n_s$ is the current timeslot number, $N_{D2D}^{comm}$ is the value of the common scrambling code parameter, and $N_{D2D}^{spec}$ is the value of the specific scrambling code parameter.

Optionally, in another embodiment, the processor 510 is specifically configured to: divide the value of the scrambling code parameter into at least two scrambling code segments, and scramble the to-be-sent bit by using the at least two scrambling code segments.

Optionally, in another embodiment, the processor 510 is specifically configured to: generate a cyclic redundancy code check (CRC) bit of the to-be-sent bit, and use the to-be-sent bit and the CRC bit of the to-be-sent bit as a to-be-scrambled bit; divide the to-be-scrambled bit into at least two to-be-scrambled bit segments; generate a CRC bit of each to-be-scrambled bit segment in the at least two to-be-scrambled bit segments; and separately scramble CRC bits of the at least two to-be-scrambled bit segments by using the at least two scrambling code segments.

Optionally, in another embodiment, the processor 510 is specifically configured to: divide the to-be-sent bit into at least two to-be-sent bit segments; generate a CRC bit of each to-be-sent bit segment in the at least two to-be-sent bit segments; and separately scramble CRC bits of the at least two to-be-sent bit segments by using the at least two scrambling code segments.

The user equipment 500 according to this embodiment of the present invention may be corresponding to first user equipment in the D2D communication method according to the embodiments of the present invention, and the foregoing and other operations and/or functions of modules in the user equipment 500 are for implementing corresponding procedures of methods in FIG. 1 to FIG. 5. For brevity, details are not described herein.

Therefore, the user equipment according to this embodiment of the present invention determines a value of at least one scrambling code parameter of a common scrambling code parameter or a specific scrambling code parameter, and scrambles a to-be-sent bit according to the value of the scrambling code parameter, so that transmission information can be scrambled in a D2D communication process, thereby improving feasibility of a D2D communication scheme and improving user experience.

Figure 10:
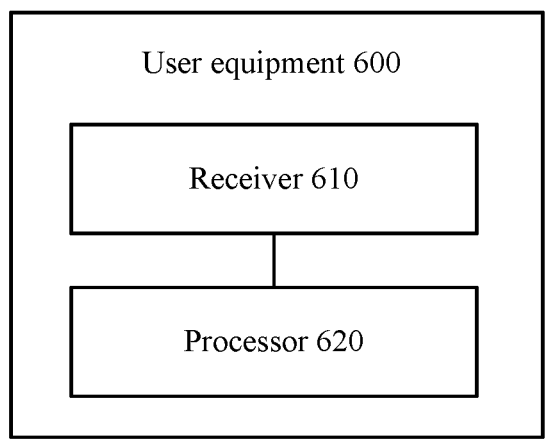
FIG. 10 is a schematic block diagram of user equipment according to still another embodiment of the present invention.

FIG. 10 shows a schematic block diagram of user equipment 600 according to still another embodiment of the present invention. As shown in FIG. 10, the user equipment 600 includes:

a receiver 610, configured to receive a bit sent by first user equipment; and a processor 620, configured to: determine a value of a scrambling code parameter of the first user equipment, where the scrambling code parameter includes at least one of the following parameters: a common scrambling code parameter and a specific scrambling code parameter; and descramble, according to the value of the scrambling code parameter, the bit received by the receiver 610.

Therefore, the user equipment according to this embodiment of the present invention determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

It should be understood that, in this embodiment of the present invention, the processor 610 may be a central processing unit, or the processor 610 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

Optionally, the user equipment 600 may further include a memory, where the memory may include a read-only memory and a random access memory, and provide data and an instruction for the processor 620. A part of the memory may further include a nonvolatile random access memory. For example, the memory may further store information about a device type.

In an implementation process, steps in the foregoing methods may be completed by means of an integrated logic circuit of hardware in the processor 620 or an instruction in a form of software. Steps in the methods disclosed with reference to the embodiments of the present invention may be directly executed and completed by a hardware processor, or may be executed and completed by using a combination of hardware and software modules in the processor. The software module may be located in a mature storage medium in the field, such as a random memory, a flash memory, a read-only memory, a programmable read-only memory, an electrically-erasable programmable memory, or a register. The storage medium is located in the memory.

The processor 620 reads information in the memory and completes the steps in the foregoing methods in combination with hardware of the processor 620. To avoid repetition, details are not described herein.

Optionally, if the scrambling code parameter includes the common scrambling code parameter, a value of the common scrambling code parameter is determined by the first user equipment according to a D2D synchronization signal;

a value of the common scrambling code parameter is determined by the first user equipment according to a primary D2D synchronization channel PD2DSCH; or a value of the common scrambling code parameter is a cluster identifier of a D2D cluster to which the first user equipment belongs.

Optionally, in another embodiment, if the scrambling code parameter includes the specific scrambling code parameter, a value of the specific scrambling code parameter is obtained after an operation is performed on at least one of a D2D identifier of the first user equipment, a D2D group identifier of the first user equipment, or a service type identifier of the first user equipment by using a preset function.

Optionally, in another embodiment, the value of the specific scrambling code parameter is the D2D identifier of the first user equipment;

the value of the specific scrambling code parameter is the D2D group identifier of the first user equipment; or the value of the specific scrambling code parameter is the service type identifier of the first user equipment.

Optionally, in another embodiment, the function is a hash function or a truncate function.

Optionally, in another embodiment, the processor 620 is specifically configured to:
  determine the value of the common scrambling code parameter according to the D2D synchronization signal;
  determine the value of the common scrambling code parameter according to the primary D2D synchronization channel PD2DSCH; or
  determine a cluster identifier of a D2D cluster to which the user equipment 600 belongs as the value of the common scrambling code parameter.

Optionally, in another embodiment, the processor 620 is specifically configured to determine a number of the D2D synchronization signal as the value of the common scrambling code parameter.

Optionally, in another embodiment, the D2D synchronization signal includes a primary D2D synchronization signal PD2DSS and a secondary D2D synchronization signal SD2DSS, and
  correspondingly, the processor 620 is specifically configured to determine the value of the common scrambling code parameter according to the PD2DSS and the SD2DSS.

Optionally, in another embodiment, the processor 620 is specifically configured to determine the value $N_{D2D}^{comm}$ of the common scrambling code parameter according to the following formula:

$$N_{D2D}^{comm} = 3 \times N_{SD2DSS} + N_{PD2DSS} \quad (26), \text{ where}$$

$N_{SD2DSS}$ is a number of the SD2DSS, and $N_{PD2DSS}$ is a number of the PD2DSS.

Optionally, in another embodiment, the receiver 610 is further configured to receive indication information sent by a base station or a cluster head of a D2D cluster to which the user equipment 600 belongs, where the indication information is used to indicate the value of the scrambling code parameter of the first user equipment; and
  the processor 620 is further configured to determine the value of the scrambling code parameter according to the indication information received by the receiver 610.

Optionally, in another embodiment, if the first user equipment scrambles a to-be-sent bit in a manner of data channel scrambling, the user equipment 600 may also correspondingly descramble the received bit in a manner of data channel descrambling. The processor 620 is specifically configured to: determine a scrambling code initial value according to the value of the scrambling code parameter, generate a scrambling code sequence according to the scrambling code initial value, and descramble the received bit by using the scrambling code sequence.

Optionally, in another embodiment, the processor 620 is specifically configured to:
  determine the value of the common scrambling code parameter as the scrambling code initial value; or
  determine the value of the specific scrambling code parameter as the scrambling code initial value.

Optionally, in another embodiment, the processor 620 is specifically configured to determine the scrambling code initial value according to the value of the scrambling code parameter and a current timeslot number.

Optionally, in another embodiment, the processor 620 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D} + 1) \times 2^9 + N_{D2D}, \text{ or} \quad (27)$$

$$c_{init} = \left\lfloor \frac{n_s}{2} \right\rfloor \times 2^9 + N_{D2D}, \quad (28)$$

where
  $n_s$ is the current timeslot number, and $N_{D2D}$ is the value of the common scrambling code parameter or the value of the specific scrambling code parameter.

Optionally, in another embodiment, the processor 620 is specifically configured to determine the scrambling code initial value $c_{init}$ according to the following formula:

$$c_{init} = \left(\left\lfloor \frac{n_s}{2} \right\rfloor + 1\right) \times (2 \times N_{D2D}^{comm} + 1) \times 2^{16} + N_{D2D}^{spec}, \text{ or} \quad (29)$$

$$c_{init} = N_{D2D}^{spec} \times 2^{14} + \left\lfloor \frac{n_s}{2} \right\rfloor \times 2^9 + N_{D2D}^{comm}, \quad (30)$$

where
  $n_s$ is the current timeslot number, D2D is the value of the common scrambling code parameter, and $N_{D2D}^{spec}$ is the value of the specific scrambling code parameter.

Optionally, in another embodiment, if the first user equipment scrambles a to-be-sent bit in a manner of CRC scrambling, the user equipment 600 may also descramble the received bit in a manner of CRC descrambling. Optionally, the bit received by the receiver 610 includes at least two bit segments, and each bit segment in the at least two bit segments includes a data bit segment and a CRC bit; and
  correspondingly, the processor 620 is specifically configured to: divide the value of the scrambling code parameter into at least two scrambling code segments, and separately descramble CRC bits of the at least two bit segments by using the at least two scrambling code segments, to obtain at least two to-be-checked bit segments.

Optionally, in another embodiment, the processor 620 is further configured to: perform CRC check on each to-be-checked bit segment in the at least two obtained to-be-checked bit segments to obtain a data bit segment of each to-be-checked bit segment, and cascade data bit segments of the at least two to-be-checked bit segments to obtain a data bit.

Optionally, in another embodiment, the data bit obtained by the processor 620 includes an original data bit and a CRC bit, and correspondingly,
  the processor 620 is further configured to perform CRC check on the data bit to obtain the original data bit.

The user equipment 600 according to this embodiment of the present invention may be corresponding to second user equipment in the D2D communication method according to the embodiments of the present invention, and the foregoing and other operations and/or functions of modules in the user equipment 600 are for implementing corresponding procedures of methods in FIG. 6. For brevity, details are not described herein.

Therefore, the user equipment according to this embodiment of the present invention determines a value of at least one scrambling code parameter of a common scrambling code parameter or a specific scrambling code parameter, and descrambles a received bit according to the value of the scrambling code parameter, so that transmission information can be descrambled in a D2D communication process, thereby improving feasibility of a D2D communication scheme and improving user experience.

It should be understood that the term "and/or" in the embodiments of the present invention describes only an association relationship for describing associated objects and represents that three relationships may exist. For example, A and/or B may represent the following three cases: only A exists, both A and B exist, and only B exists. In addition, the character "/" in this specification generally indicates an "or" relationship between associated objects.

A person of ordinary skill in the art may be aware that, in combination with the methods described in the embodiments disclosed in this specification, steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (English full name: Read-Only Memory, English abbreviation: ROM), a random access memory (English full name: Random Access Memory, English abbreviation: RAM), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A device to device (D2D) communication method, comprising:
   determining, by a first user equipment, a value of a scrambling code parameter, wherein the scrambling code parameter comprises a specific scrambling code parameter;
   scrambling, by the first user equipment, a to-be-sent bit according to the value of the scrambling code parameter; and
   sending, by the first user equipment, the scrambled to-be-sent bit;
   wherein the value of the specific scrambling code parameter is determined according to a D2D group identifier of the first user equipment and a truncate function, the truncate function is used to truncate an identifier from a back end to a front end.

2. The D2D communication method according to claim 1, wherein the scrambling, by the first user equipment, the to-be-sent bit according to the value of the scrambling code parameter comprises:
   determining, by the first user equipment, a scrambling code initial value according to the value of the scrambling code parameter; and
   generating, by the first user equipment, a scrambling code sequence according to the scrambling code initial value, and scrambling the to-be-sent bit by using the scrambling code sequence.

3. The D2D communication method according to claim 2, wherein the determining, by the first user equipment, the scrambling code initial value according to the value of the scrambling code parameter further comprises:
   determining, by the first user equipment, the value of the specific scrambling code parameter as the scrambling code initial value.

4. A device to device (D2D) communication method, comprising:
   receiving, by a second user equipment, a bit sent by a first user equipment;
   determining, by the second user equipment, a value of a scrambling code parameter of the first user equipment, wherein the scrambling code parameter comprises a specific scrambling code parameter; and
   descrambling, by the second user equipment, the received bit according to the value of the scrambling code parameter;
   wherein a value of the specific scrambling code parameter is obtained after an operation is performed on a D2D group identifier of the first user equipment by using a preset function as a truncate function to truncate an identifier from a back end to a front end.

5. The D2D communication method according to claim 4, wherein the descrambling, by the second user equipment, the received bit according to the value of the scrambling code parameter further comprises:
   determining, by the second user equipment, a scrambling code initial value according to the value of the scrambling code parameter; and
   generating, by the second user equipment, a scrambling code sequence according to the scrambling code initial value, and descrambling the received bit by using the scrambling code sequence.

6. The D2D communication method according to claim 5, wherein the determining, by the second user equipment, the scrambling code initial value according to the value of the scrambling code parameter further comprises:
   determining, by the second user equipment, the value of the specific scrambling code parameter as the scrambling code initial value.

7. User equipment, comprising:
   a processor, configured to determine a value of a scrambling code parameter, wherein the scrambling code parameter comprises a specific scrambling code parameter; and scramble a to-be-sent bit according to the value of the scrambling code parameter; and
   a transmitter, configured to send the to-be-sent bit scrambled by the processor;
   wherein the value of the specific scrambling code parameter is determined according to a D2D group identifier of the user equipment and a truncate function, the truncate function is used to truncate an identifier from a back end to a front end.

8. The user equipment according to claim 7, wherein the processor is further configured to determine a scrambling code initial value according to the value of the scrambling code parameter; and generate a scrambling code sequence according to the scrambling code initial value determined by the determining unit, and scramble the to-be-sent bit by using the scrambling code sequence.

9. User equipment, comprising:
   a receiver, configured to receive a bit sent by a first user equipment;
   a processor, configured to determine a value of a scrambling code parameter of the first user equipment, wherein the scrambling code parameter comprises a specific scrambling code parameter; and
   the processor is further configured to descramble, according to the value that is of the scrambling code parameter and the bit received by the receiver;
   wherein a value of the specific scrambling code parameter is obtained after an operation is performed on a D2D group identifier of the first user equipment by using a preset function as a truncate function to truncate an identifier from a back end to a front end.

10. The user equipment according to claim 9, wherein the processor is further configured to determine a scrambling code initial value according to the value of the scrambling code parameter; and generate a scrambling code sequence according to the scrambling code initial value determined by the third determining unit, and descramble the received bit by using the scrambling code sequence.

* * * * *

UNITED STATES PATENT AND TRADEMARK OFFICE
CERTIFICATE OF CORRECTION

PATENT NO. : 10,129,917 B2
APPLICATION NO. : 15/112849
DATED : November 13, 2018
INVENTOR(S) : Jian Wang Page 1 of 1

It is certified that error appears in the above-identified patent and that said Letters Patent is hereby corrected as shown below:

On the Title Page

Page 2, item [56], Column 2, Line 18, delete "Hisilicon," and insert -- HiSilicon, --, therefor.

In the Specification

Column 20, Line 16, delete "where comm" and insert -- where --, therefor.

Column 40, Line 22, delete "D2D" and insert -- $N_{D2D}^{comm}$ --, therefor.

In the Claims

Column 43, in Claim 7, Line 20, delete "User" and insert -- A user --, therefor.

Column 44, in Claim 9, Line 8, delete "User" and insert -- A user --, therefor.

Signed and Sealed this
Thirtieth Day of August, 2022

Katherine Kelly Vidal
*Director of the United States Patent and Trademark Office*